(12) United States Patent  
Oosawa et al.

(10) Patent No.: US 10,322,568 B2  
(45) Date of Patent: Jun. 18, 2019

(54) SHAPED PRODUCT OF FIBER-REINFORCED COMPOSITE MATERIAL AND METHOD OF MANUFACTURING THE SAME

(71) Applicant: Teijin Limited, Osaka-Shi, Osaka (JP)

(72) Inventors: Yukino Oosawa, Osaka (JP); Hidenori Aoki, Osaka (JP); Hodaka Yokomizo, Osaka (JP)

(73) Assignee: Teijin Limited, Osaka-Shi, Osaka (JP)

( * ) Notice: Subject to any disclaimer, the term of this patent is extended or adjusted under 35 U.S.C. 154(b) by 43 days.

(21) Appl. No.: 15/247,990

(22) Filed: Aug. 26, 2016

(65) Prior Publication Data

US 2017/0057208 A1 Mar. 2, 2017

(30) Foreign Application Priority Data

Aug. 28, 2015 (JP) .................. 2015-169159

(51) Int. Cl.
| | |
|---|---|
| B32B 27/08 | (2006.01) |
| B32B 27/20 | (2006.01) |
| B32B 27/34 | (2006.01) |
| B32B 27/36 | (2006.01) |
| B29C 70/46 | (2006.01) |
| B29C 70/54 | (2006.01) |
| B29C 70/12 | (2006.01) |
| B29C 39/00 | (2006.01) |
| B29K 69/00 | (2006.01) |
| B29K 77/00 | (2006.01) |

(Continued)

(52) U.S. Cl.
CPC ............ B32B 27/08 (2013.01); B29C 39/00 (2013.01); B29C 70/12 (2013.01); B29C 70/46 (2013.01); B29C 70/545 (2013.01); B32B 27/20 (2013.01); B32B 27/34 (2013.01); B32B 27/365 (2013.01); B29K 2069/00 (2013.01); B29K 2077/00 (2013.01); B29K 2105/12 (2013.01); B29K 2307/04 (2013.01); B32B 2262/106 (2013.01)

(58) Field of Classification Search
CPC ......... B29C 39/00; B29C 70/12; B29C 70/46; B29C 70/545

See application file for complete search history.

(56) References Cited

U.S. PATENT DOCUMENTS

| | | | | |
|---|---|---|---|---|
| 4,631,221 A | * | 12/1986 | Disselbeck | ............. B29C 51/00 428/166 |
| 2013/0309001 A1 | * | 11/2013 | Teshima | .................. B32B 27/04 403/270 |
| 2014/0178631 A1 | | 6/2014 | Taniguchi et al. | |

FOREIGN PATENT DOCUMENTS

| | | |
|---|---|---|
| JP | H11-001841 A | 1/1999 |
| JP | 2013-031998 A | 2/2013 |

(Continued)

*Primary Examiner* — Monica A Huson  
*Assistant Examiner* — Kelsey C Grace  
(74) *Attorney, Agent, or Firm* — Banner & Witcoff, Ltd.

(57) ABSTRACT

A shaped product of a fiber-reinforced composite material includes a well-shaped part and a surface-shaped part, in which the well-shaped part includes a fiber-reinforced composite material C including both discontinuous reinforcing fibers and a thermoplastic resin, and the surface-shaped part includes a thermoplastic-resin-based material, and the shaped product includes no irregular-shape portion in the well-shaped part and no weld at a boundary edge between the well-shaped part and the surface-shaped part.

7 Claims, 8 Drawing Sheets

(51) Int. Cl.
*B29K 105/12* (2006.01)
*B29K 307/04* (2006.01)

(56) References Cited

FOREIGN PATENT DOCUMENTS

JP 2013-230579 A 11/2013
WO 2013-031860 A1 3/2013

* cited by examiner

*FIG. 5A1* 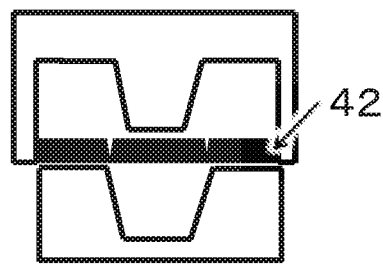
*FIG. 5A2* 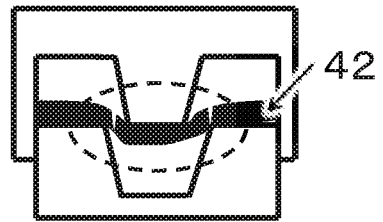
*FIG. 5A3* 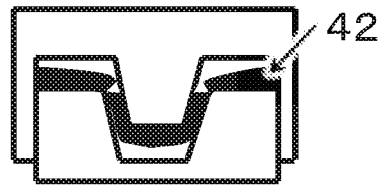
*FIG. 5A4* 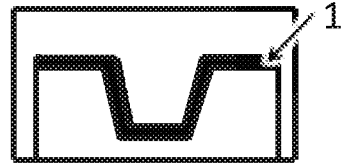
*FIG. 5A5* 

SHAPED PRODUCT OF FIBER-REINFORCED COMPOSITE MATERIAL AND METHOD OF MANUFACTURING THE SAME

CROSS-REFERENCE TO RELATED APPLICATION

This application claims the benefit of Japanese Patent Application No. 2015-169159, filed on Aug. 28, 2015, the entire contents of which are hereby incorporated by reference.

BACKGROUND OF THE INVENTION

Technical Field

The present invention relates to a shaped product of a fiber-reinforced composite material. The shaped product of the fiber-reinforced composite material of the invention is suitable for use as automotive structural members, etc.

Background Art

In the field of machinery, shaped products including a thermoplastic resin and discontinuous reinforcing fibers, e.g., carbon fibers, are attracting attention in recent years. These shaped products are excellent in terms of tensile modulus, tensile strength, impact resistance, etc. since discontinuous reinforcing fibers having some degree of fiber length have been dispersed therein, and uses thereof as, for example, structural members for motor vehicles and the like are being investigated. Preferred as a process for producing these shaped products is the so-called cold press forming, in which a forming material including a thermoplastic resin and discontinuous reinforcing fibers (hereinafter, this forming material is often referred to simply as "FRTP forming material") is heated to a temperature not lower than the softening temperature thereof and is then placed in and press-formed with forming dies set at a temperature lower than the softening temperature. This forming method is preferred because of the excellent production efficiency.

Among automotive structural members and the like are ones which are hollow and bottomed and ones which have a relatively deep recessed part (called "well-shaped part", "deep-drawn part", etc.). Examples of methods for producing such a member having a well-shaped part include a method in which constituent portions each having an easy-to-form shape are separately formed and these constituent portions are thereafter bonded together to obtain a desired member. According to this method, however, the joints where the constituent portions have been bonded remain as welds and always have rather low strength. Known as a preferred method for overcoming such problem is deep drawing in which one sheet of a forming material is pressed and a part of the sheet is pushed into a rather deep die cavity to obtain a shaped product having a well-shaped part. In particular, with respect to the deep drawing of metallic materials, the technique is considered to have already been established and come to be used practically.

It has been attempted to produce a shaped product having a well-shaped part by press-forming an FRTP forming material by a method according to the deep drawing of metallic materials.

Since FRTP forming materials generally have low tensile elongations at break at temperatures in the range of ordinary temperature to the melting temperature, there is a tendency that when producing a shaped product having a well-shaped part or the like by cold press forming, the FRTP forming material wrinkles upon drawing. Furthermore, even when it is attempted to press out the formed wrinkles by the cold press forming, the pressure being applied to the FRTP forming material is uneven and, hence, this cold press forming tends to give a shaped product having defects such as thickness unevenness, voids, etc. The above-described problem concerning thickness unevenness and voids in the case of press-forming an FRTP forming material to obtain a shaped product having a well-shaped part is far more serious than in the case where neat thermoplastic resins containing no reinforcing fibers are subjected to the same forming.

In the case where the FRTP forming material is subjected mainly in the form of a plate to press forming to produce a shaped article having a recess or a protrusion, e.g., a well-shaped part, the portion which has wrinkled has an increased product wall thickness and the recessed part has a reduced wall thickness because the material itself has been stretched. It has hence been impossible to obtain a shaped article in which all the portions each have a wall thickness within an allowable difference from a design value. In particular, it has been extremely difficult to press-form an FRTP forming material to obtain a shaped product including a well-shaped part which has a wall thickness within an allowable difference from a design value.

Investigations are being made on methods for overcoming such problems encountered when a shaped product having a well-shaped part is produced from an FRTP forming material.

Patent document 1 (JP-A-2013-230579) discloses a method whereby a shaped product of a fiber-reinforced resin free from a property decrease and surface irregularities is produced while preventing the occurrence of voids due to interstices among the carbon fibers. It is disclosed that a deep-drawn shaped resin product in which even the corner part, which has undergone a considerable deformation from the raw sheet, and the like have satisfactory surface properties is obtained by the method.

Patent document 2 (JP-A-2013-31998) discloses a method in which a shaped article of a fiber-reinforced plastic that has a deep-drawn shape having a top with an angle of 90 degrees or smaller and that has a satisfactory appearance is obtained by press forming with high production efficiency.

Patent document 3 (JP-A-11-1841) discloses a thermoplastic-resin forming material which is a forming material obtained by forming reinforcing fiber bundles coated with a thermoplastic resins into a cloth or braided fabric and then cutting the reinforcing fiber bundles only without cutting the resin coating of the cloth or braided fabric, and which has excellent impregnability and strength and is capable of producing shaped products having a complicated shape or a shape that requires deep drawing.

SUMMARY

However, the forming method described in patent document 1 cannot be used for producing a material in which carbon fibers have already been composited with a thermoplastic resin, since a fiber layer and a thermoplastic-resin layer are separately disposed. This forming method has a reduced operation efficiency, and is poor in suitability for general uses. The method described in patent document 2 requires use of special forming dies and does not have freedom of designing forming dies. In particular, the forming method in patent document 2 is considered to be limited in the dimensions of not only the well-shaped part of the shaped product but also the rim part (surface-shaped part) surrounding the opening of the well-shaped part. The method of patent document 2 hence cannot be regarded as a method capable of supplying shaped products of various shapes according to demands. The method for fiber cutting described in patent document 3 is intended to reduce fiber distribution unevenness and is insufficient in terms of mitigation of defects due to wrinkles generated during forming.

With respect to shaped products each having both a well-shaped part and a surface-shaped part, there are cases where such a shaped product is desired to be produced so that the surface-shaped part and the well-shaped part are respectively formed from separate thermoplastic-resin-based materials, because of a cost reduction, required properties, etc. However, such a demand is not taken into account in any of the background-art techniques described above.

The present inventors have discovered that in cases when a shaped product having a well-shaped part and a surface-shaped part is one in which there is no weld at the boundary edge between the well-shaped part and the surface-shaped part, this shaped product has sufficient strength in many applications and is preferred. However, attention has not been directed, in background-art techniques, to a shaped product of a fiber-reinforced composite material which includes a well-shaped part and a surface-shaped part and has no weld at the boundary edge between these parts and in which the reinforcing fibers are discontinuous reinforcing fibers. The term "weld" (also called a weld line or a weld mark) means a linear mark on a shaped product obtained by resin forming, the linear mark being formed during the forming when a plurality of flows of the molten resin occur in the forming die cavity and meet each other. At the linear mark, the shaped product locally has low strength.

An object of the invention is to provide: a shaped product of a fiber-reinforced composite material (hereinafter often abbreviated to "FRCM shaped product") which includes a portion including a fiber-reinforced composite material including both discontinuous reinforcing fibers and a thermoplastic resin and which is excellent in terms of appearance and strength and has a well-shaped part and a surface-shaped part; and a process for highly efficiently producing the FRCM shaped product.

The present inventors diligently made investigations and, as a result, have discovered that the problems described above can be overcome with the aspects of the present invention which are shown below.

1. A shaped product of a fiber-reinforced composite material, including a well-shaped part and a surface-shaped part,
   in which the well-shaped part includes a fiber-reinforced composite material C including both discontinuous reinforcing fibers and a thermoplastic resin,
   the surface-shaped part includes a thermoplastic-resin-based material, and
   the shaped product includes no irregular-shape portion in the well-shaped part and no weld at a boundary edge between the well-shaped part and the surface-shaped part.
2. The shaped product of the fiber-reinforced composite material according to item 1 above, in which the well-shaped part has a hollow, and the surface-shaped part has an opening which communicates with the hollow.
3. The shaped product of the fiber-reinforced composite material according to item 1 or 2 above, in which in the surface-shaped part, a layer of the fiber-reinforced composite material C extends from the well-shaped part into a vicinity of the boundary edge.
4. The shaped product of the fiber-reinforced composite material according to any one of items 1 to 3 above, in which in the surface-shaped part, a layer of the fiber-reinforced composite material C extends from the well-shaped part into a vicinity of the boundary edge over a length K from the boundary edge, the length K being 3 to 100 times a thickness t of the surface-shaped part located in the vicinity of the boundary edge.
5. The shaped product of the fiber-reinforced composite material according to any one of items 2 to 4 above, which satisfies (a diameter Φ of a circle having the same area as a hole area of the opening of the surface-shaped part)/2≤(a depth E of the hollow of the well-shaped part).
6. The shaped product of the fiber-reinforced composite material according to any one of items 1 to 5 above, in which the well-shaped part has an external surface area of 600 mm² or larger.
7. The shaped product of the fiber-reinforced composite material according to any one of items 1 to 6 above, in which a ratio of a wall thickness t' of the well-shaped part to a thickness t of the surface-shaped part located in a vicinity of the boundary edge, t'/t, is in the range of 0.2 to 8.0.
8. The shaped product of the fiber-reinforced composite material according to any one of items 1 to 7 above, in which the discontinuous reinforcing fibers are one or more kinds of reinforcing fibers selected from the group consisting of carbon fibers, glass fibers, aramid fibers, boron fibers, and basalt fibers and have a weight-average fiber length of 100 mm or less.
9. The shaped product of the fiber-reinforced composite material according to any one of items 1 to 8 above, in which a tensile elongation at break εv (%) of the well-shaped part, an opening distance L' between outlet ends of the opening of the well-shaped part, and an external creeping dimension D' of the well-shaped part which corresponds to said opening distance satisfy:

$$D'-L' \times \varepsilon v/100 > 0.$$

10. The shaped product of the fiber-reinforced composite material according to any one of items 1 to 9 above, in which the well-shaped part has a tensile elongation at break εv of 105 to 400%.
11. The shaped product of the fiber-reinforced composite material according to any one of items 1 to 10 above, which is a shaped product obtained by cold press forming, in which
    forming dies are used in which a forming cavity is formed with a protrudent die having at least a protrusion and a recessed die having both a recess and a non-recess part,
    a platy forming material P comprising a thermoplastic-resin-based material and a platy forming material Q including a fiber-reinforced composite material C including both discontinuous reinforcing fibers and a thermoplastic resin are disposed between the protrudent die and the recessed die, and the forming dies are closed by moving at least one of the protrudent die and the recessed die,
    a tensile elongation at break εv (%) of the platy forming material Q, an opening distance L between outlet ends of the recess of the recessed die, and an internal creeping dimension D of the recessed die which corresponds to said opening distance satisfy:

$$D - L \times \varepsilon v/100 > 0,$$

the platy forming material P and the platy forming material Q are disposed between the protrudent die and the recessed die so that at least a part of the platy forming material Q overlaps the platy forming material P and that the platy forming material P and the platy forming material Q lie on a recessed-die side and on a protrudent-die side, respectively, the platy forming material Q is disposed in an amount corresponding to 60 to 400 vol % of the design volume of the fiber-reinforced composite material C which constitutes the well-shaped part of the shaped product of the fiber-reinforced composite material, and the length over which the platy forming material Q overlaps the platy forming material P is 3 to 40 times a thickness of the platy forming material P.

12. A process for producing, by cold press forming, the shaped product of the fiber-reinforced composite material according to any one of items 1 to 11 above which includes: a well-shaped part including a fiber-reinforced composite material C including both discontinuous reinforcing fibers and a thermoplastic resin; and a surface-shaped part including a thermoplastic-resin-based material, the process including using forming dies in which a forming cavity is formed with a protrudent die having at least a protrusion and a recessed die having both a recess and a non-recess part, disposing a platy forming material P including the thermoplastic-resin-based material and a platy forming material Q including the fiber-reinforced composite material C between the protrudent die and the recessed die, and closing the forming dies by moving at least one the protrudent die and the recessed die, in which the tensile elongation at break εv (%) of the platy forming material Q, the opening distance L between outlet ends of the recess of the recessed die, and that internal creeping dimension D of the recessed die which corresponds to said opening distance satisfy:

$$D - L \times \varepsilon v / 100 > 0,$$

the platy forming material P and the platy forming material Q are disposed between the protrudent die and the recessed die so that at least a part of the platy forming material Q overlaps the platy forming material P and that the platy forming material P and the platy forming material Q lie on a recessed-die side and on a protrudent-die side, respectively, the platy forming material Q is disposed in an amount corresponding to 60 to 400 vol % of the design volume of the fiber-reinforced composite material C which constitutes the well-shaped part of the shaped product of the fiber-reinforced composite material, and the length over which the platy forming material Q overlaps the platy forming material P is 3 to 40 times a thickness of the platy forming material P.

13. The process for production according to item 12 above, in which the protrudent die of the forming dies is an upper die and the recessed die of the forming dies is a lower die, the platy forming material P and the platy forming material Q are disposed over the lower die, the die closing to be conducted by moving at least one of the protrudent die and the recessed die is an operation of at least one of lowering the upper die and raising the lower die, the platy forming material P is disposed on the lower die of the forming dies so that at least a part thereof is in contact with the non-recess part, and the platy forming material Q is disposed so that at least a part thereof overlaps the platy forming material P over the recess of the lower die.

14. The process for production according to item 13 above, wherein the platy forming material P has a hole having a size in a range of 5 to 150% of a projected area of the recess of the lower die on which the platy forming material P is to be disposed, the projected area being measured through projection toward the bottom direction.

15. The process for production according to item 12 above, in which the protrudent die of the forming dies is a lower die and the recessed die of the forming dies is an upper die, the platy forming material P and the platy forming material Q are disposed over the lower die, the die closing to be conducted by moving at least one of the protrudent die and the recessed die is an operation of at least one of lowering the upper die and raising the lower die, the platy forming material P is disposed over the protrusion of the lower die by placing the platy forming material P on the platy forming material Q so that at least a part thereof overlaps the platy forming material Q, and the platy forming material Q is disposed on the protrusion of the lower die so that at least a part thereof overlaps the platy forming material P.

16. The process for production according to item 15 above, in which the platy forming material P has a hole having a size in a range of 5 to 150% of a projected area of the recess of the upper die, the projected area being measured through projection toward the bottom direction.

17. The process for production according to any one of items 12 to 15 above, in which the platy forming material Q has a tensile elongation at break εv of 105 to 400%.

18. The process for production according to item 12 above, in which the platy forming material P has a hole, an incision, or both, and the platy forming material P is disposed in the forming dies so that after the forming dies have been closed, the hole or the incision or both of the platy forming material P are in contact with the recess of the recessed die.

For the purpose of reference, a further aspect of the invention is disclosed below.

A process for producing the shaped product of the fiber-reinforced composite material according to any one of item 1 to 11 above which includes a well-shaped part including a fiber-reinforced composite material C including both discontinuous reinforcing fibers and a thermoplastic resin and further includes a surface-shaped part including a thermoplastic-resin-based material that is the same fiber-reinforced composite material C, namely, which includes a well-shaped part and a surface-shaped part that each includes the fiber-reinforced composite material C, the process including using forming dies in which a forming cavity is formed with an upper die having at least a protrusion and a lower die having both a recess and a non-recess part, disposing on the lower die a platy forming material Q including the fiber-reinforced composite material C, and then conducting cold press forming by performing an operation of lowering at least one the upper die and raising the lower die, the process being characterized by satisfying the following requirements i") and ii"):

i") a tensile elongation at break εv (%) of the platy forming material Q, an opening distance L between outlet ends of the recess of the lower die, and an internal creeping dimension D of the lower die which corresponds to said opening distance satisfy:

$$D - L \times \varepsilon v / 100 > 0;$$

ii") the platy forming material Q has a structure (tension relaxation structure) that relaxes tension which occurs when the platy forming material Q comes into contact with the forming dies during the cold press forming.

Moreover, for the purpose of reference, still a further aspect of the invention is disclosed below.

A process for producing a shaped product of a fiber-reinforced composite material by using forming dies in which a forming cavity is formed with an upper die and a lower die, disposing a platy forming material P including a thermoplastic-resin-based material and a platy forming material Q including a fiber-reinforced composite material C which includes both discontinuous reinforcing fibers and a thermoplastic resin, and then conducting cold press forming by performing an operation of at least one of lowering the upper die and raising the lower die, in which the platy forming material P and the platy forming material Q are disposed in the forming dies so that the platy forming material Q overlaps with the platy forming material P so as to satisfy: (an overlapping length of the material P and the material Q)/(a thickness of a stacked part in the shaped product of the fiber-reinforced composite material to be obtained)≥3.

A shaped product of a fiber-reinforced composite material as one aspect of the invention is excellent in terms of appearance and strength, is far more lightweight than metallic shaped products having the same dimensions and shape, has a high degree of freedom of shape and material, can be produced at low cost, and is suitable for use as various members, components, and automotive structural members.

BRIEF DESCRIPTION OF THE DRAWINGS

In some of the drawings, the forming dies have each been drawn as if the die is open in the directions perpendicular to the page, for reasons of convenience of explanation. In these modes, however, each forming die may provide a closable cavity when the opposed forming die (upper die in the drawing) mates therewith.

FIG. 5A1 to FIG. 5A5 are diagrammatic views which illustrate the operation of die closing in cold press forming and an example of shaped products obtained thereby.

Figure 1:
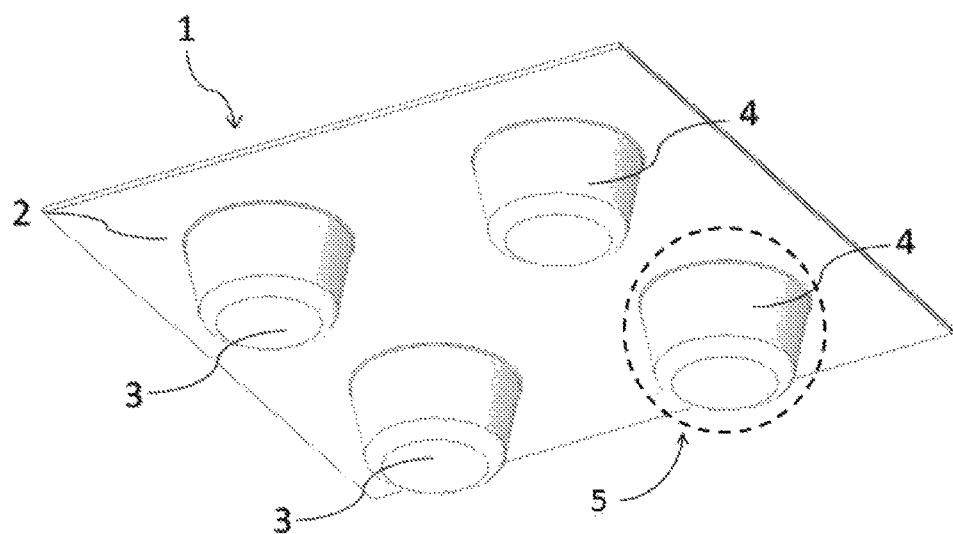
FIG. 1 is a diagrammatic view which shows an example of the FRCM shaped product of the invention, the example including well-shaped parts and a surface-shaped part.

The reference numerals and sings in the drawings have the following meanings.

1 Example of a shaped product of a fiber-reinforced composite material having well-shaped part and surface-shaped part
2 Surface-shaped part
3 Bottom of well-shaped part
4 Wall of well-shaped part
5 Well-shaped part
11 Opening
12 Projected shaped of opening, projected area of opening
13 Bottom of well-shaped part
E Depth of well-shaped part
L Opening distance between outlet ends of recess of recessed die
L' Opening distance between outlet ends of opening of well-shaped part of FRCM shaped product
D Recessed-die internal creeping dimension corresponding to the opening distance L between outlet ends of the recess of the recessed die
D' Well-shaped-part external creeping dimension corresponding to the opening distance L' between outlet ends of the opening of the well-shaped part of the FRCM shaped product
31, 32 Point of contact between forming material and lower die
33, 34 Point of contact between forming material and upper die
35 Incision as example of tension relaxation structure
41 Platy forming material having hole
41' Platy forming material P
42 Platy forming material Q
51 Depth of lower die of forming dies as an example of forming dies for use in evaluating tensile elongation at break εv
61 Overlapping length
62 Direction to be the longitudinal direction of bending test piece to be cut out of the shaped product
(x) Length, before elongation, of platy forming material Q in the evaluation of tensile elongation at break εv
(y) Length, after elongation, of platy forming material Q in the evaluation of tensile elongation at break εv

DETAILED DESCRIPTION OF THE INVENTION

Modes for carrying out the invention are explained below in order.

{1} Shaped Product of Fiber-Reinforced Composite Material having Well-Shaped Part and Surface-Shaped Part The present invention is a shaped product of a fiber-reinforced composite material including a well-shaped part and a surface-shaped part, in which the well-shaped part includes a fiber-reinforced composite material C including both discontinuous reinforcing fibers and a thermoplastic resin and the surface-shaped part includes a thermoplastic-resin-based material, and the shaped product includes no irregular-shape portion in the well-shaped part and no weld at a boundary edge between the well-shaped part and the surface-shaped part.

[Well-Shaped Part]

The term "well-shaped part" in the invention means a recessed and/or protrudent portion within an FRCM shaped product, such portion being represented, for example, by deep-drawn shapes. The direction in which a well-shaped part protrudes and the number of well-shaped parts can be suitably selected in accordance with applications of the shaped product, and are not particularly limited.

Figure 2A:
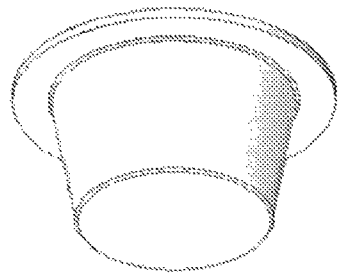
FIG. 2A is a diagrammatic view which shows an example of the FRCM shaped product of the invention, the example including a well-shaped part and a surface-shaped part.
Figure 2B:
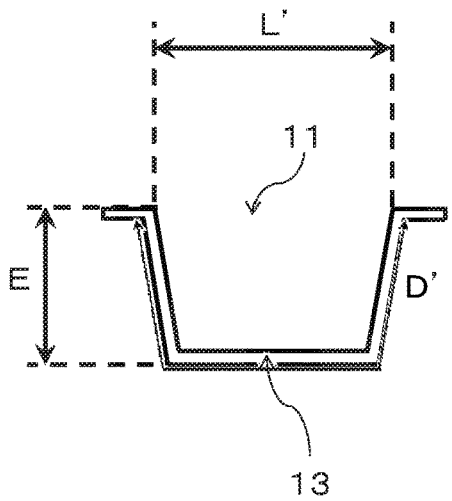
FIG. 2B is a cross-sectional view which shows the example of the FRCM shaped product of the invention that includes a well-shaped part and a surface-shaped part.

The bottom of the well-shaped part which is shown as an example by numeral 13 in FIG. 2B can have a circular or polygonal, planar shape, a semispherical shape, a conical shape, a polygonal shape, etc. However, the shape of the bottom is not limited to these, and may be any desired complicated shape. The wall of the well-shaped part may be parallel or not. The vertical wall may be perpendicular or oblique. The bottom may have one or more holes therein. The well-shaped part may have a multi-stage shape. The projected shape of the well-shaped part shown as an example by numeral 12 in FIG. 2C can be a circular, elliptic, triangular, rectangular, or polygonal shape or the like. However, the projected shape thereof is not limited to these examples, and may be any desired complicated shape. As apparent from the statement that the well-shaped part may be a protrudent portion, the well-shaped part need not always protrude downward when the shaped product is, for example, in use, and may protrude upward or in a lateral direction. A well-shaped part which protrudes upward can be regarded as a tower-shaped part, and the portion which was referred to as bottom of a well-shaped part above can also be called the top of a tower-shaped part.

The well-shaped part in the FRCM shaped product of the invention includes a fiber-reinforced composite material C (hereinafter often abbreviated to "material C") including both discontinuous reinforcing fibers and a thermoplastic resin. Preferred examples of the discontinuous reinforcing fibers and thermoplastic resin will be described later. The ratio of the discontinuous reinforcing fibers to the thermoplastic resin in the material C will also be described later as the volume proportion of reinforcing fibers. This material C may contain the "other ingredients" which will be shown later.

It is preferable that the well-shaped part in the FRCM shaped product of the invention should have an external-surface area of 600 mm$^2$ or larger, because this FRCM shaped product is apt to be useful in many applications. The external-surface area thereof is more preferably 2,000 mm$^2$ or larger, even more preferably 5,000 mm$^2$ or larger. Although there is no particular upper limit on the external-surface area of the well-shaped part, the external-surface area thereof is preferably 150,000 mm$^2$ or less, more preferably 80,000 mm$^2$ or less, even more preferably 20,000 mm$^2$ or less. The term "external-surface area of the well-shaped part" herein means the area of the external surface of the well-shaped part viewed from the side on which the well-shaped part protrudes, and does not include the area of the internal surface of the well-shaped part viewed from the hollow side.

[Surface-Shaped Part]

The term "surface-shaped part" in the invention means that surface-shaped portion in the FRCM shaped product which extends from the well-shaped part. For example, the surface-shaped part is the region including both the rim part which surrounds the opening of the well-shaped part and the portion which extends from the rim part. However, the surface-shaped part is such a region excluding any other well-shaped part. The surface-shaped part is not limited to a planar one, and may be one having a curved surface shape, a wavy surface shape, or the like or may be one having an inclined surface or steps. The surface-shaped part may also be a thin sheet or a thick bulky part, or may have a decoration such as a grain pattern, rib, or holes.

The surface-shaped part in the FRCM shaped product of the invention includes a thermoplastic-resin-based material. Preferred examples of the thermoplastic resin contained in the thermoplastic-resin-based material will be shown later. The thermoplastic-resin-based material may be a thermoplastic resin itself which contains no reinforcement, i.e., a so-called neat resin, or may be one which contains any of various reinforcements. The thermoplastic-resin-based material may be one which contains, as a reinforcement, reinforcing fibers that are inorganic fibers, organic fibers, or a mixture thereof, and the reinforcing fibers may be discontinuous reinforcing fibers, continuous fibers unidirectionally arranged in parallel, woven fabric, knit fabric, or a combination thereof. Namely, the thermoplastic-resin-based material may be a fiber-reinforced composite material including reinforcing fibers and a thermoplastic resin, or may be a fiber-reinforced composite material including discontinuous reinforcing fibers and a thermoplastic resin, or may be the same as material C. In the case where the thermoplastic-resin-based material constituting the surface-shaped part is a fiber-reinforced composite material including discontinuous reinforcing fibers and a thermoplastic resin, preferred kinds and proportions of these and the like are the same as those described above with regard to material C which constitutes the well-shaped part.

The surface-shaped part in the FRCM shaped product of the invention may be one in which some includes a neat resin and the other portion includes a fiber-reinforced composite material, or may be one in which some includes a fiber-reinforced composite material and the other portion includes another kind of fiber-reinforced composite material.

The thermoplastic-resin-based material may contain the "other ingredients" which will be shown later.

[Irregular-Shape Portion]

The term "irregular-shape portion" in the invention means an unintended shape not included in the design, such as irregular wrinkles, surface irregularities, curvature, tears, holes, weld marks, thickness differences, reinforcing-fiber projection, etc. Irregular-shape portions are so-called forming-failure portions. Undesirable surface states of the shaped product which are attributable to reduced transfer of the surface shape of the forming dies, such as partial alterations in surface texture, i.e., surface roughness and differences in texture, are defects which may be regarded as irregular-shape portions. Although there are cases where such surface states are permissible in the FRCM shaped product of the invention, those surface states should be regarded as irregular shapes and it is, of course, preferable that the shaped product should have no such surface states. The term "irregular shapes" herein includes not only irregular shapes observed through an examination of the appearance of the shaped product, such as those shown above, but also defects observed by a microscopic examination of cross-sections of the shaped product, such as many voids, weld marks at the boundary edge between the well-shaped part and the surface-shaped part, etc. With respect to the FRCM shaped product of the invention, the degrees of void content at which the voids observed by a cross-section examination are not regarded as an irregular shape are such that the void content is preferably 30% or less, more preferably 7% or less, even more preferably 1% or less. This void content preferably is a value determined by examining a cross-section of the FRCM shaped product with an optical microscope or electron microscope, dividing the area of the voids by the area of the examined portion of the cross-section of the sample, and expressing the quotient in percentage. A preferred example of procedures for obtaining the void content is shown below.

One FRCM shaped product is cut into two substantially symmetrically with respect to a line passing through the well-shaped part, and either of the cut pieces is used a s sample.

In the cross-section of the sample, an appropriate number of arbitrarily selected sites distributed in a portion ranging from the well-shaped part to the stacked part were examined with an electron microscope, and the area of voids, if any, is determined.

The area of the examined sites in the cross-section of the sample is determined, and 100×(area of the voids)/(area of the examined sites on the sample cross-section) is calculated.

The term "stacked part" means the portion in which a layered structure is observed and which is attributable to the portion where, during the forming for producing the FRCM shaped product, the platy forming material P or the platy forming material Q overlapped the other in the dies.

It is preferable that in preparation for the microscopic examination of a cross-section of the FRCM shaped product, the cross-section should be polished beforehand with sand papers and further buffed to mirror-finish the cross-section. When examining the cross-section with a microscope, the magnification may be suitably set. An example is 100 diameters.

With respect to the determination of void content, it is, of course, preferable that the whole cross-section of the sample should be examined with a microscope to determine the area of each of all the voids and the areas are summed up and used for the calculation. However, it is also preferred to examine an appropriate number of sites, for example, 20 or more sites, as stated above. For example, in the case where 20 sites on the sample cross-section are microscopically examined and photographed and a void content is determined from the 20 photographs, the void content of this sample can be calculated using the following equation: Void content=100×(total area of voids observed on the 20 photographs)/(total area of the sample cross-section in the 20 photographs).

The void content described above is void content by area as apparent from the method for determination. In the invention, however, void content by volume may be used as the void content.

Although the FRCM shaped product of the invention is one in which the well-shaped part includes no irregular-shape portion, it is, of course, preferable that the surface-shaped part also should include no irregular-shape portion.

[Relationship between the Well-Shaped Part and the Surface-Shaped Part]

The FRCM shaped product of the invention is characterized in that there is no weld at the boundary edge between the well-shaped part and the surface-shaped part. The boundary edge between the well-shaped part and the surface-shaped part is the edge part where the well-shaped part meets the surface-shaped part.

It is preferable that the well-shaped part of the FRCM shaped product of the invention should have a hollow. It is also preferable that the FRCM shaped product of the invention should be one in which the well-shaped part has a hole and the surface-shaped part has an opening which communicates with the hollow. The hollow possessed by the well-shaped part is the space formed in accordance with the shape of a well, as shown by the cross-sectional view of FIG. 2B. Namely, the well-shaped part having a hollow is not a protrudent portion which has been wholly filled, such as a protrusion formed on a forming plate by insert injection molding.

It is preferable that the FRCM shaped product of the invention should be one in which in the surface-shaped part, a layer of the fiber-reinforced composite material C extends from the well-shaped part into the vicinity of the boundary edge, that is, one in which the fiber-reinforced composite material C extends from the well-shaped part to the thermoplastic-resin-based material which constitutes the surface-shaped part, thereby forming a multilayer structure. This is because this FRCM shaped product is easy to produce and has excellent strength. The multilayer structure may have any configuration so long as the structure includes at least one layer of the thermoplastic-resin-based material and at least one layer of the fiber-reinforced composite material C. The multilayer structure may include a plurality of layers of the thermoplastic-resin-based material and/or the fiber-reinforced composite material C.

It is preferable that the FRCM shaped product of the invention should be one in which in the surface-shaped part, a layer of the material C extends from the well-shaped part into the vicinity of the boundary edge over a length K from the boundary edge, that is, one in which the material C extends from the well-shaped part to the thermoplastic-resin-based material, which constitutes the surface-shaped part, over a length K from the boundary edge to thereby from a multilayer structure, the length K being 3-100 times the thickness t of the surface-shaped part located in the vicinity of the boundary edge. This is because this shaped product has even higher strength. The value of K/t is preferably 5-100 times, more preferably 8-100 times, even more preferably 10-100 times. The upper limit of the K/t value is more preferably 75 times or less, even more preferably 50 times or less, especially preferably 40 times or less.

It is preferable that the FRCM shaped product of the invention should be one in which (a diameter $\Phi$ of a circle having the same area as the hole area of the opening of the surface-shaped part)/$2 \leq$(a depth E of the hollow of the well-shaped part). This is because this shaped product has a beautiful appearance and is apt to be useful in many applications. The "hole area of the opening of the surface-shaped part" herein may be the projected area of the opening, as measured through projection toward the bottom direction. For example, the projected area of the opening indicated by numeral 12 in FIG. 2C can be taken as the hole area.

It is preferable that the FRCM shaped product of the invention should be one in which the ratio of the wall thickness t' of the well-shaped part to the thickness t of the surface-shaped part located in the vicinity of the boundary edge, t'/t, is in the range of 0.2-8.0. This is because this shaped product has a beautiful appearance and is apt to be useful in many applications.

The FRCM shaped product of the invention may be one in which the tensile elongation at break of the well-shaped part, i.e., the tensile elongation at break εv (%) of the reinforced composite material C constituting the well-shaped part, the opening distance L' between outlet ends of the opening of the well-shaped part, and that external creeping dimension D' of the well-shaped part which corresponds to said opening distance satisfy: D'−L'×εv/100>0. This shaped product is preferred, for example, in cases when the shaped product is re-formed into a shaped product of another shape. In the case of an FRCM shaped product in which there are multiple values of the opening distance L' or external creeping dimension D', as in the case where the opening is elliptic or polygonal or where the well-shaped part is uneven in depth, it is preferable that the relationship represented by the inequality holds with respect to that cross-section of the FRCM shaped product in which the external creeping dimension D' is maximum.

The FRCM shaped product of the invention may be one in which the tensile elongation at break of the well-shaped part, namely, the tensile elongation at break εv (%) of the reinforced composite material C constituting the well-shaped part, is 105-400%. This shaped product is preferred, for example, in cases when the shaped product is re-formed into a shaped product of another shape. A definition of the tensile elongation at break and a method for calculation thereof are as will be described later with respect to the tensile elongation at break of a forming material. In the invention, in cases when a shaped product is obtained by forming a certain forming material, the tensile elongation at break of the portion yielded only from the forming material can be regarded as equal to the tensile elongation at break of said forming material.

It is preferable that the FRCM shaped product of the invention should be an FRCM shaped product which, as described above, includes a well-shaped part and a surface-shaped part, in which the well-shaped part includes a fiber-reinforced composite material C including both discontinuous reinforcing fibers and a thermoplastic resin and the surface-shaped part includes a thermoplastic-resin-based material, the well-shaped part includes no irregular-shape portion, and there is no weld at the boundary edge between the well-shaped part and the surface-shaped part, and which has been obtained by cold press forming, in which forming dies are used in which a forming cavity is formed with a protrudent die having at least a protrusion and a recessed die having both a recess and a non-recess part, a platy forming material P including a thermoplastic-resin-based material and a platy forming material Q including a fiber-reinforced composite material C including both discontinuous reinforcing fibers and a thermoplastic resin are disposed between the protrudent die and the recessed die, and the forming dies are closed by moving at least one of the protrudent die and the recessed die, the tensile elongation at break εv (%) of the platy forming material Q, the opening distance L between outlet ends of the recess of the recessed die, and that internal creeping dimension D of the lower die which corresponds to said opening distance satisfy:

$D - L \times \varepsilon v / 100 > 0$, the platy forming material P and the platy forming material Q are disposed between the protrudent die and the recessed die so that at least some of the platy forming material Q overlaps the platy forming material P and that the platy forming material P and the platy forming material Q lie on the recessed-die side and on the protrudent-die side, respectively, the platy forming material Q is disposed in an amount corresponding to 60-400 vol % of the design volume of the fiber-reinforced composite material C which constitutes the well-shaped part of the shaped product of the fiber-reinforced composite material, and the length over which the platy forming material Q overlaps the platy forming material P is 3-40 times the thickness of the platy forming material P.

The tensile elongation at break εv, the opening distance L between outlet ends of the recess of the recessed die, and the internal creeping dimension D of the lower die are as will be described later with regard to processes for producing the FRCM shaped product of the invention.

The relational expression regarding the tensile elongation at break εv (%) of the platy forming material Q, the opening distance L between outlet ends of the recess of the recessed die, and that internal creeping dimension D of the lower die which corresponds to said opening distance can be rearranged by replacing the tensile elongation at break εv (%) of the platy forming material Q with the tensile elongation at break εv (%) of the fiber-reinforced composite material C constituting the well-shaped part, replacing the opening distance L between outlet ends of the recess of the recessed die with the opening distance L' of outlet ends of the opening of the FRCM shaped product, and replacing that internal creeping dimension D of the lower die which corresponds to the opening distance L between outlet ends of the recess of the recessed die with that external creeping dimension D' of the well-shaped part which corresponds to the opening distance L' of outlet ends of the opening of the FRCM shaped product, thereby obtaining $D' - L' \times \varepsilon v / 100 > 0$.

[Reinforcing Fibers]

(Kinds of Reinforcing Fibers)

The kind of reinforcing fibers to be used in the invention can be suitably selected in accordance with the kind of the thermoplastic resin, uses of the composite material, etc., and is not particularly limited. Consequently, either inorganic fibers or organic fibers are suitable for use as the reinforcing fibers in the invention.

Examples of the inorganic fibers include carbon fibers, activated carbon fibers, graphite fibers, glass fibers, tungsten carbide fibers, silicon carbide fibers, ceramic fibers, alumina fibers, natural mineral fibers (e.g., basalt fibers), boron fibers, boron nitride fibers, boron carbide fibers, and metal fibers.

Examples of the metal fibers include aluminum fibers, copper fibers, brass fibers, stainless-steel fibers, and steel fibers.

Examples of the glass fibers include fibers including glass-E, glass-C, glass-S, glass-D, glass-T, quartz glass, and borosilicate glass.

Examples of the organic fibers include fibers including aramids, PBO (poly(p-phenylenebenzoxazole)), poly(phenylene sulfide), polyesters, acrylics, polyamides, polyolefins, poly(vinyl alcohol), and polyarylates.

In the invention, two or more kinds of reinforcing fibers may be used in combination. In this case, multiple kinds of inorganic fibers may be used in combination, or multiple kinds of organic fibers may be used in combination. Alternatively, inorganic fibers and organic fibers may be used in combination. Examples of aspects in which multiple kinds of inorganic fibers are used in combination include an aspect in which carbon fibers and metal fibers are used in combination and an aspect in which carbon fibers and glass fibers are used in combination. Meanwhile, examples of aspects in which multiple kinds of organic fibers are used in combination include an aspect in which aramid fibers are used in combination with fibers including another organic material. Furthermore, examples of aspects in which inorganic fibers and organic fibers are used in combination include an aspect in which carbon fibers and aramid fibers are used in combination.

(Carbon Fibers)

In the invention, it is preferred to use carbon fibers as the reinforcing fibers. This is because carbon fibers are capable of giving composite materials which are lightweight but have excellent strength.

Generally known as such carbon fibers are polyacrylonitrile (PAN)-based carbon fibers, petroleum-pitch-based carbon fibers, coal-pitch-based carbon fibers, rayon-based carbon fibers, cellulose-based carbon fibers, lignin-based carbon fibers, phenol-based carbon fibers, vapor-phase-growth carbon fibers, and the like. In the invention, carbon fibers of any of these types are suitable for use.

Preferred of these for use in the invention are polyacrylonitrile (PAN)-based carbon fibers, from the standpoint of the excellent tensile strength thereof. In the case of using PAN-based carbon fibers as the reinforcing fibers, the tensile modulus thereof is preferably in the range of 100-600 GPa, more preferably in the range of 200-500 GPa, even more preferably in the range of 230-450 GPa. The tensile strength of the PAN-based carbon fibers is preferably in the range of 2,000-10,000 MPa, more preferably in the range of 3,000-8,000 MPa.

(Fiber Length of the Reinforcing Fibers)

The fiber length of the reinforcing fibers to be used in the invention is not particularly limited, and continuous fibers and discontinuous reinforcing fibers can be used. It is, however, important that the reinforcing fibers contained in the fiber-reinforced composite material C which constitutes the well-shaped part of the FRCM shaped product of the invention should be discontinuous reinforcing fibers.

The discontinuous reinforcing fibers have a weight-average fiber length of preferably 100 mm or less, more preferably 1-100 mm, even more preferably 3-80 mm, especially preferably 5-60 mm. In cases when the weight-average fiber length of the reinforcing fibers is 100 mm or less, the forming material including the reinforcing fibers shows satisfactory flowability and it is easy to obtain shaped products of desired shapes by press forming, etc. Meanwhile, in cases when the weight-average fiber length thereof is 1 mm or larger, the forming material including the reinforcing fibers is apt to have satisfactory mechanical strength. It is more preferable that the lower limit of each of the ranges of the weight-average fiber length of the discontinuous reinforcing fibers should be larger than 10 mm. It is even more preferable that the reinforcing fibers which satisfy each of the ranges of weight-average fiber length should be carbon fibers.

The discontinuous reinforcing fibers to be used in the invention preferably are one or more kinds of reinforcing fibers which are selected form the group consisting of carbon fibers, glass fibers, aramid fibers, boron fibers, and basalt fibers and have a weight-average fiber length of 100 mm or less. Such reinforcing fibers having a weight-average fiber length within the range shown above are more preferred.

In the invention, reinforcing fibers which differ in fiber length from one another may be used in combination. In other words, the reinforcing fibers to be used in the invention may be ones which have a weight-average fiber length distribution having a single peak or may be one which have a weight-average fiber length distribution having a plurality of peaks.

An average fiber length of reinforcing fibers can be determined, for example, by randomly extracting 100 fibers from the forming material, measuring the length of each of the fibers with a caliper or the like down to the order of mm, and calculating the average length on the basis of the following expression (f). The average fiber length is determined in terms of weight-average fiber length (Lw). When the length of each carbon fiber is expressed by Li and the number of carbon fibers examined is expressed by j, then the number-average fiber length (Ln) and the weight-average fiber length (Lw) are determined using the following expressions (e) and (f).

$$Ln=\Sigma Li/j \quad \text{expression (e)}$$

$$Lw=(\Sigma Li^2)/(\Sigma Li) \quad \text{expression (f)}$$

In the case of reinforcing fibers having an even fiber length, the number-average fiber length and the weight-average fiber length are the same value. Consequently, the value of number-average fiber length obtained through a measurement and a calculation can be regarded as the weight-average fiber length.

The extraction of reinforcing fibers from a shaped product or forming material can be conducted, for example, after the shaped product (forming material) is subjected to a heat treatment of about 500° C.×1 hr using a heating oven to remove the resin in the oven.

(Single-Fiber Diameter of the Reinforcing Fibers)

The single-fiber diameter of the reinforcing fibers to be used in the invention may be suitably determined in accordance with the kind of the reinforcing fibers, and is not particularly limited. For example, in the case of using carbon fibers as the reinforcing fibers, the average single-fiber diameter is usually preferably in the range of 3-50 µm, more preferably in the range of 4-12 µm, even more preferably in the range of 5-8 µm.

Meanwhile, in the case of using glass fibers as the reinforcing fibers, the average single-fiber diameter is usually preferably in the range of 3-30 µm. The term "average single-fiber diameter" herein means the diameter of the single fibers which constitute the reinforcing fibers.

The average single-fiber diameter of reinforcing fibers can be determined, for example, by the method described in JIS R7607 (2000).

(Configuration of the Reinforcing Fibers)

Regardless of the kind thereof, the reinforcing fibers to be used in the invention may be composed of independent single fibers or may be in the form of single-fiber bundles each made up of a plurality of single fibers. The reinforcing fibers contained in the FRCM shaped product of the invention may be ones composed of independent single fibers alone or ones composed of single-fiber bundles alone, or may be a mixture of both. The term "single-fiber bundle" herein means two or more single fibers which have been brought close to each other by a sizing agent, electrostatic force, etc. In the case of using reinforcing fibers composed of single fibers, the single-fiber bundles may be substantially equal to each other or differ from each other in the number of the single fibers constituting each single-fiber bundle.

Most of the reinforcing fibers which are commercially produced and on the market have a structure in which the single fibers have been bundled. Although the number of single fibers varies from bundle to bundle, the number thereof is in the range of 1,000 to 100,000 in many cases. For example, carbon fibers are generally in the form of bundles each made up of several thousands to tens of thousands of single carbon fibers gathered together.

In cases when reinforcing fibers are used for producing a composite material without being widened or opened, there are cases where the reinforcing fibers locally have an increased thickness at portions where the fibers have been entangled, making it difficult to obtain a thin-walled composite material. It is therefore preferable that reinforcing fibers should be used for composite materials after having been widened or opened.

In the case of opening reinforcing fibers before use, the degree of opening is not particularly limited. It is, however, preferred to control the degree of opening of the reinforcing fibers so that the opened reinforcing fibers include both reinforcing fibers each made up of single reinforcing fibers not less than a specific number and either reinforcing fibers each made up of single reinforcing fibers less than the specific number or single fibers, namely, free single reinforcing fibers.

Specifically, such configuration of reinforcing fibers preferably is the configuration of reinforcing fibers in random mats described in U.S. Pat. No. 8,946,342. For example, preferred is a mixture of: reinforcing fibers (A) each constituted by single reinforcing fibers, the number of which is not less than the critical number of single fiber defined by the following expression (1) (for convenience, sometimes referred to as "reinforcing fibers (A) each constituted by single fibers not less than the critical number of single fiber"); and other reinforcing fibers (B). The reinforcing fibers (B) may be reinforcing fibers each constituted by single reinforcing fibers less than the critical number of single fiber, or may be free single reinforcing fibers, or may be a mixture of both. For convenience, the reinforcing fibers each constituted by single reinforcing fibers less than the critical number of single fiber defined by the following expression (1) are sometimes referred to as "reinforcing fibers each constituted by single fibers less than the critical number of single fiber". In the invention, in cases when the reinforcing fibers are carbon fibers or glass fibers, there are cases where the reinforcing fibers (A) are referred to as carbon fibers (A) or glass fibers (A).

$$\text{Critical number of single fiber}=600/d \qquad (1)$$

(In expression (1), d is the average single-fiber diameter (μm) of the reinforcing fibers.)

Specifically, in the case where the reinforcing fibers constituting the shaped product have an average single-fiber diameter of 5-7 μm, the critical number of single fibers defined by expression (1) is 86-120.

It is preferable that the reinforcing fibers contained in the shaped product of the fiber-reinforced composite-material of the invention or in the fiber-reinforced composite material to be used for producing the shaped product should be a mixture of reinforcing fibers (A) and other reinforcing fibers (B), as stated above. It is preferable that either the reinforcing fibers (A) or the reinforcing fibers (B) or both should be a mixture or reinforcing fibers differing in the number of single reinforcing fibers.

In the invention, the proportion of the reinforcing fibers (A) to all the reinforcing fibers in the composite material is preferably higher than 0 vol % but less than 99 vol %, more preferably 20 vol % or higher but less than 99 vol %, even more preferably 30 vol % or higher but less than 95 vol %, most preferably 50 vol % or higher but less than 90 vol %. This is because by causing reinforcing fibers each made up of single reinforcing fibers not less than the specific number to coexist with other reinforcing fibers in a specific proportion as shown above, the amount of reinforcing fibers present, i.e., the volume content of reinforcing fibers (Vf), in the composite material can be increased.

In the invention, the average number of single fibers (N) of the reinforcing fibers (A) is not particularly limited and can be suitably determined so long as the objects of the invention are not defeated thereby.

In the case of most general-purpose reinforcing fibers, the N is usually in the range of 1<N<12,000. It is more preferable that the N should satisfy the following expression (2).

$$0.6\times10^4/d^2<N<1.0\times10^5/d^2 \qquad (2)$$

(In expression (2), d is the average single-fiber diameter (μm) of the reinforcing fibers.)

In the case where the reinforcing fibers are carbon fibers having an average single-fiber diameter of 5 μm, the average number of single fibers (N) of the reinforcing fibers (A) which is defined by expression (2) is in the range of from more than 240 to less than 4,000. The range of the average number of single fibers (N) is preferably 300 to 2,500, more preferably 400 to 1,600. In the case where the reinforcing fibers are carbon fibers having an average single-fiber diameter of 7 μm, the average number of single fibers (N) of the reinforcing fibers (A) which is defined by expression (2) is in the range of from more than 122 to less than 2,041. The range of the average number of single fibers (N) is preferably 150 to 1,500, more preferably 200 to 800.

(Oriented State of the Reinforcing Fibers)

The oriented state of the reinforcing fibers in the material C in the FRCM shaped product of the invention, in particular, in the well-shaped part thereof, may be any of various kinds according to purposes. However, preferred is a state in which the discontinuous reinforcing fibers have not been aligned in a specific in-plane direction of the material C and include few reinforcing fibers aligned in the thickness direction, that is, the so-called two-dimensional random orientation. In particular, the state of carbon fibers in random mats or the like which is described in U.S. Pat. No. 8,946,342 is suitable.

[Thermoplastic Resin]

The thermoplastic resin to be used in the invention is not particularly limited so long as an FRCM shaped product having desired strength can be obtained therewith. An appropriate thermoplastic resin is suitably selected.

Examples of the thermoplastic resin include polyolefin resins, polystyrene resins, thermoplastic polyamide resins, polyester resins, polyacetal resins (polyoxymethylene resins), polycarbonate resins, (meth)acrylic resins, polyarylate resins, poly(phenylene ether) resins, polyimide resins, polyethernitrile resins, phenoxy resins, poly(phenylene sulfide) resins, polysulfone resins, polyketone resins, polyetherketone resins, thermoplastic urethane resins, fluororesins, thermoplastic polybenzimidazole resins, and vinyl resins.

Examples of the polyolefin resins include polyethylene resins, polypropylene resins, polybutadiene resins, and polymethylpentene resins.

Examples of the vinyl resins include vinyl chloride resins, vinylidene chloride resins, vinyl acetate resins, and poly (vinyl alcohol) resins.

Examples of the polystyrene resins include atactic polystyrene resins, isotactic polystyrene resins, syndiotactic polystyrene resins, acrylonitrile/styrene resins (AS resins), and acrylonitrile/butadiene/styrene resins (ABS resins).

Examples of the polyamide resins include polyamide-6 resins (nylon-6), polyamide-11 resins (nylon-11), polyamide-12 resins (nylon-12), polyamide-46 resins (nylon-46), polyamide-66 resins (nylon-66), and polyamide-610 resins (nylon-610).

Examples of the polyester resins include poly(ethylene terephthalate) resins, poly(ethylene naphthalate) resins, poly(butylene terephthalate) resins, poly(trimethylene terephthalate) resins, and liquid-crystal polyesters. Examples of the (meth)acrylic resins include poly(methyl methacrylate). Examples of the modified poly(phenylene ether) resins include modified poly(phenylene ether)s.

Examples of the thermoplastic polyimide resins include thermoplastic polyimides, poly(amide-imide) resins, and polyetherimide resins.

Examples of the polysulfone resins include modified polysulfone resins and poly(ether sulfone) resins.

Examples of the polyetherketone resins include polyetherketone resins, polyetheretherketone resins, and polyetherketoneketone resins.

Examples of the fluororesins include polytetrafluoroethylene.

The thermoplastic resin to be used in the invention may be a copolymer or a modified resin. One thermoplastic resin may be used as the only thermoplastic resin, or two or more thermoplastic resins may be used. Examples of the aspect in which two or more thermoplastic resins are used in combination include an aspect in which thermoplastic resins differing in softening temperature, or in melting point or glass transition temperature in the invention, are used in combination and an aspect in which thermoplastic resins differing in average molecular weight are used in combination. However, the combined use of thermoplastic resins is not limited to these examples.

(Volume Content of Reinforcing Fibers (Vf))

The volume content of reinforcing fibers (hereinafter often referred to simply as "Vf") in the shaped product produced by the production process of the invention is not particularly limited. However, it is preferable that the volume content of fibers (Vf), which is defined by the following expression (b) regarding the reinforcing fibers and the thermoplastic resin both included in the shaped product, should be 5 to 80%. More preferably, the Vf is 20 to 60%.

$Vf=100\times$(volume of reinforcing fibers)/[(volume of reinforcing fibers)+(volume of thermoplastic resin)]   expression (b)

In cases when the Vf of the shaped product is higher than 5%, a sufficient reinforcing effect is produced. In cases when the Vf is 80% or less, the shaped product obtained is less apt to have voids therein and the possibility that the shaped product might have reduced properties is low.

(Reinforcing-fiber Areal Weight and Thickness)

The areal weight of the reinforcing fibers in each forming material is not particularly limited. However, the areal weight thereof is usually preferably 25 to 10,000 g/m².

The thickness of each forming material to be used in the invention is not particularly limited. Usually, however, the thickness thereof is desirably in the range of 0.01 to 100 mm, preferably in the range of 0.01 to 10 mm, more preferably in the range of 0.1 to 5 mm, even more preferably in the range of 0.3 to 3 mm.

In the case where a forming material to be used in the invention (e.g., the forming material P or the forming material Q) has a configuration composed of a plurality of superposed and united layers, that thickness is not the thickness of each layer but the sum of the thicknesses of these layers, i.e., the thickness of the whole composite material.

(Multilayer State)

The forming materials to be used in the invention, including the platy forming materials P and Q, each may be one having a single-layer structure constituted of a single layer or may be one having a multilayer structure composed of a plurality of layers which have been superposed and united together.

The aspect in which a forming material has such a multilayer structure may be one in which the forming material is composed of a plurality of superposed layers having the same composition or may be one in which the forming material is composed of a plurality of superposed layers differing in composition from each other. In the case of a forming material which is a composite material including reinforcing fibers, the aspect in which the composite material has a multilayer structure may be one in which layers that differ from each other in the aligned or oriented state of the reinforcing fibers have been superposed. Examples of this aspect include one in which a layer including reinforcing fibers that have been unidirectionally aligned and a layer including reinforcing fibers that have been randomly oriented two-dimensionally are superposed. In the case of superposing three of more layers, use may be made of a sandwich structure which includes any desired core layer and skin layers superposed respectively on the front and back surfaces of the core layer.

(Other Ingredients)

The forming materials to be used in the invention may contain additives so long as the inclusion thereof does not defeat the objects of the invention. Examples of the additives include various fibrous or non-fibrous fillers, such as organic fibers or inorganic fibers, flame retardants, UV stabilizers, stabilizers, release agents, pigments, softeners, plasticizers, and surfactants.

[Method for producing the Forming Materials]

The composite material to be used in the invention can be produced using a generally known method. For example, two-dimensionally randomly oriented mats (hereinafter referred to as random mats) and methods for producing the random mats are described in detail in U.S. Pat. No. 8,946,342 and U.S. Patent Application Publication No. 2015/0258762.

In shaped products obtained from random mats such as those described above, the carbon fibers have not been aligned in a specific in-plane direction and have been disposed in the state of having been oriented in random in-plane directions. Namely, such a shaped product is a material which has in-plane isotropy.

{2} Processes for Producing the FRCM Shaped Product

The present invention includes the following invention which relates to a process for producing a shaped product of a fiber-reinforced composite material including a well-shaped part and a surface-shaped part, in which the well-shaped part includes a fiber-reinforced composite material C including both discontinuous reinforcing fibers and a thermoplastic resin and the surface-shaped part includes a thermoplastic-resin-based material, the well-shaped part includes no irregular-shape portion, and there is no weld at the boundary edge between the well-shaped part and the surface-shaped part. In cases when an FRCM shaped product having a well-shaped part and a surface-shaped part is produced by press forming, there are cases where the FRCM shaped product obtained by disposing a plurality of platy forming materials in the vicinity of the recess of dies, i.e., the portion corresponding to the well-shaped part of the shaped product, and closing the dies has irregular-shape portions in the surface and inner parts thereof, depending on the relative positions of the platy forming materials and the proportion of the sizes thereof.

[Basic Production Process]

A preferred process for producing the shaped product of the fiber-reinforced composite material of the invention described above is a process for producing, by cold press forming, a shaped product of a fiber-reinforced composite material which includes a well-shaped part including a fiber-reinforced composite material C including both discontinuous reinforcing fibers and a thermoplastic resin and a surface-shaped part including a thermoplastic-resin-based material, the process including using forming dies in which a forming cavity is formed with a protrudent die having at least a protrusion and a recessed die having both a recess and a non-recess part, disposing a platy forming material P including the thermoplastic-resin-based material and a platy forming material Q including the fiber-reinforced composite material C between the protrudent die and the recessed die, and closing the forming dies by moving at least one of the protrudent die and the recessed die, in which the tensile elongation at break εv (%) of the platy forming material Q, the opening distance L between outlet ends of the recess of the recessed die, and that internal creeping dimension D of the lower die which corresponds to said opening distance satisfy:

$$D-L \times \varepsilon v/100 > 0,$$

the platy forming material P and the platy forming material Q are disposed between the protrudent die and the recessed die so that at least some of the platy forming material Q overlaps the platy forming material P and that the platy forming material P and the platy forming material Q lie on the recessed-die side and on the protrudent-die side, respectively, the platy forming material Q is disposed in an amount corresponding to 60 to 400 vol % of the design volume of the fiber-reinforced composite material C which constitutes the well-shaped part of the shaped product of the fiber-reinforced composite material, and the length over which the platy forming material Q overlaps the platy forming material P is 3 to 40 times the thickness of the platy forming material P. This production process is referred to as "basic production process" in this description.

[Production Process 1]

A more preferred process for producing the shaped product of the fiber-reinforced composite material of the invention is the basic production process in which the protrudent die of the forming dies is an upper die and the recessed die of the forming dies is a lower die, the platy forming material P and the platy forming material Q are disposed over the lower die, the die closing to be conducted by moving at least one of the protrudent die and the recessed die is an operation of at least one of lowering the upper die and raising the lower die, the platy forming material P is disposed on the lower die of the forming dies so that at least a part thereof is in contact with the non-recess part, and the platy forming material Q is disposed so that at least a part thereof overlaps the platy forming material P over the recess of the lower die. This production process is referred to as Production Process 1 in this description.

Production Process 1 can be defined using other expressions, as follows: a process for producing a shaped product of a fiber-reinforced composite material which includes a well-shaped part including a fiber-reinforced composite material C including both discontinuous reinforcing fibers and a thermoplastic resin and a surface-shaped part including a thermoplastic-resin-based material, the process including using forming dies in which a forming cavity is formed with an upper die having at least a protrusion and a lower die having both a recess and a non-recess part, disposing a platy forming material P including the thermoplastic-resin-based material and a platy forming material Q including the fiber-reinforced composite material C on the lower die, and then conducting cold press forming by performing the operation of lowering at least one of the upper die and raising the lower die, the process being characterized by satisfying the following requirements i) to iv).

i) The tensile elongation at break εv (%) of the platy forming material Q, the opening distance L between outlet ends of the recess of the lower die, and that internal creeping dimension D of the lower die which corresponds to said opening distance satisfy:

$$D-L \times \varepsilon v/100 > 0.$$

ii) The platy forming material P is disposed on the lower die so that at least some of the platy forming material P is in contact with the non-recess part.

iii) The platy forming material Q is disposed over the recess of the lower die in an amount corresponding to 60 to 400 vol % of the design volume of the fiber-reinforced composite material C which constitutes the well-shaped part of the shaped product of the fiber-reinforced composite material, so that at least some of the platy forming material Q overlaps the platy forming material P.

iv) The length over which the platy forming material Q overlaps the platy forming material P is 3 to 40 times the thickness of the platy forming material P.

[Production Process 2]

Another more preferred process for producing the shaped product of the fiber-reinforced composite material of the invention is the basic production process in which the protrudent die of the forming dies is a lower die and the recessed die of the forming dies is an upper die, the platy forming material P and the platy forming material Q are disposed over the lower die, the die closing to be conducted by moving at least one of the protrudent die and the recessed die is an operation of at least one of lowering the upper die and raising the lower die, the platy forming material P is disposed over the protrusion of the lower die by placing the platy forming material P on the platy forming material Q so that at least a part thereof overlaps the platy forming material Q, and the platy forming material Q is disposed on the protrusion of the lower die so that at least a part thereof overlaps with the platy forming material P. This production process is referred to as Production Process 2 in this description.

Production Process 2 can be defined using other expressions, as follows: a process for producing a shaped product of a fiber-reinforced composite material which includes a well-shaped part including a fiber-reinforced composite material C including both discontinuous reinforcing fibers and a thermoplastic resin and a surface-shaped part including a thermoplastic-resin-based material, the process including using forming dies in which a forming cavity is formed with a lower die having at least a protrusion and an upper die having both a recess and a non-recess part, disposing a platy forming material P including the thermoplastic-resin-based material and a platy forming material Q including the fiber-reinforced composite material C on the lower die, and then conducting cold press forming by performing an operation of at least one of lowering the upper die and raising the lower die, the process being characterized by satisfying the following requirements i') to iv').

i') The tensile elongation at break εv (%) of the platy forming material Q, the opening distance L between outlet ends of the recess of the upper die, and that internal creeping dimension D of the upper die which corresponds to said opening distance satisfy:

$$D - L \times \varepsilon v/100 > 0.$$

ii') The platy forming material P is disposed over the protrusion of the lower die by placing the platy forming material P on the platy forming material Q so that at least a part thereof overlaps the platy forming material Q.

iii') The platy forming material Q is disposed on the protrusion of the lower die in an amount corresponding to 60 to 400 vol % of the design volume of the fiber-reinforced composite material C which constitutes the well-shaped part of the shaped product of the fiber-reinforced composite material, so that at least some of the platy forming material Q overlaps with the platy forming material P.

iv') The length over which the platy forming material P overlaps the platy forming material Q is 3 to 40 times the thickness of the platy forming material P.

[Production Process 3]

Furthermore disclosed herein is an invention which is a process for producing a shaped product of a fiber-reinforced composite material which includes a well-shaped part including a fiber-reinforced composite material C including both discontinuous reinforcing fibers and a thermoplastic resin and further includes a surface-shaped part including a thermoplastic-resin-based material that is the same fiber-reinforced composite material C, namely, which includes a well-shaped part and a surface-shaped part that each includes the fiber-reinforced composite material C, the process including using forming dies in which a forming cavity is formed with an upper die having at least a protrusion and a lower die having both a recess and a non-recess part, disposing on the lower die a platy forming material Q constituted of the fiber-reinforced composite material C, and then conducting cold press forming by performing the operation of lowering at least one of the upper die and raising the lower die, the process being characterized by satisfying the following requirements i") and ii"). This production process is referred to as Production Process 3 in this description.

i") The tensile elongation at break εv (%) of the platy forming material Q, the opening distance L between outlet ends of the recess of the lower die, and that internal creeping dimension D of the lower die which corresponds to said opening distance satisfy:

$$D - L \times \varepsilon v/100 > 0.$$

ii") The platy forming material Q has a structure (tension relaxation structure) that relaxes tension which occurs when the platy forming material Q comes into contact with the forming dies during the cold press forming.

[Forming Dies]

Forming dies are roughly divided into two kinds; one is closed forming dies for use in casting, injection molding, press forming, and the like and the other is open forming dies for use in bending, deep drawing, forging, and the like. The closed forming dies are suitable mainly for methods in which the material is caused to flow thereinto and molded, while the open forming dies are suitable mainly for methods in which the material is deformed and formed, without being caused to flow.

Either closed forming dies or open forming dies can be used in one embodiment of the invention. However, preferred are forming dies in which a forming cavity is formed with an upper die having at least a protrusion and a lower die having both a recess and a non-recess part, i.e., press-forming dies. The shapes, materials, etc. of the forming dies are suitably selected in accordance with forming conditions and the shape of the desired shaped product. The recess and protrusion possessed by the forming dies are the portions having shapes corresponding to the well-shaped part possessed by the desired FRCM shaped product.

[Forming Materials]

It is preferable that forming materials to be used in one embodiment of the invention should be platy forming materials. The term "platy" herein means a shape which is neither powdery nor granular and in which the length along the longitudinal direction, i.e., length direction, and the length along the width direction, which is perpendicular to that direction, are larger than the length along the shortest-dimension direction (thickness).

The platy forming material P, which includes a thermoplastic-resin-based material, preferably includes any of the thermoplastic-resin-based materials shown above as examples of the material which constitutes the surface-shaped part of the FRCM shaped product, and more preferably is material C shown above as an example of the material which constitutes the well-shaped part of the FRCM shaped product.

With respect to the platy forming material Q (hereinafter often abbreviated to "material Q"), it is important that material Q should include the fiber-reinforced composite material C including both discontinuous reinforcing fibers and a thermoplastic resin, which was shown above as an example of the material constituting the well-shaped part of the FRCM shaped product.

Figure 6A:
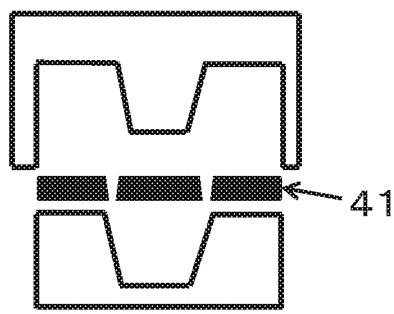
FIG. 6A and FIG. 6C are schematic views of press forming in which a platy forming material having a hole is used.
Figure 6B:
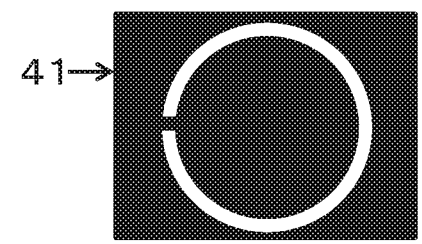
FIG. 6B and FIG. 6D are diagrammatic views of the holed platy forming materials used respectively in the press forming shown by FIG. 6A and FIG. 6C.
Figure 6C:
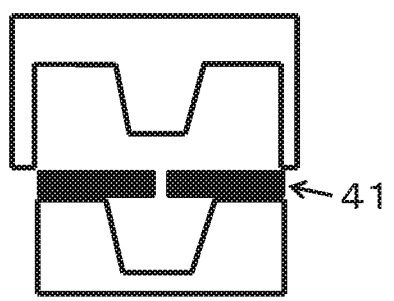
Figure 6D:
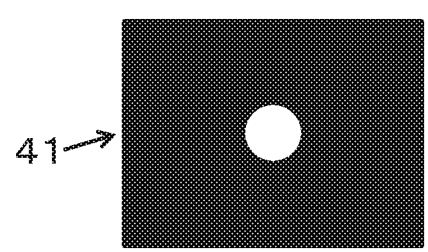
Figure 6E:
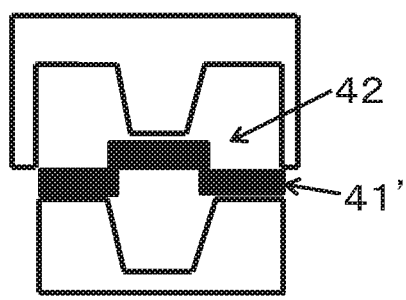
FIG. 6E is a schematic view of press forming in which a platy forming material having a hole and another platy forming material superposed thereon are press-formed.

Especially preferred examples of material Q and the platy forming material P (hereinafter often abbreviated to "material P") are the sheet-shaped forming material described in U.S. Pat. No. 7,754,323, the random mat described in U.S. Pat. No. 8,946,342, and composite materials obtained by the method described in U.S. Patent Application Publication No. 2015/0005434. It is preferable that these platy forming materials each should be one which has been produced by heating and pressing a single layer or superposed multiple layers of a mixture of a thermoplastic resin and reinforcing fibers and in which the thermoplastic resin has infiltrated into interstices among the reinforcing fibers. In Production Process 1, material P is disposed on the lower die of the forming dies so that at least a part thereof is in contact with the non-recess part (example: FIG. 6E, 41'). In Production Process 2, material P is disposed over the protrusion of the lower die by placing the material P on material Q so that at least a part thereof overlaps the material Q.

In Production Process 1, material Q is disposed over the recess of the lower die in an amount corresponding to 60 to 400 vol % of the design volume of the fiber-reinforced composite material C which constitutes the well-shaped part of the shaped product of the fiber-reinforced composite material, so that at least some of the material Q overlaps the material P.

In Production Process 2, material Q is disposed on the protrusion of the lower die in an amount corresponding to 60 to 400 vol % of the design volume of the fiber-reinforced composite material C which constitutes the well-shaped part of the shaped product of the fiber-reinforced composite material, so that at least some of the material Q overlaps with the platy forming material P.

In Production Processes 1 and 2, the length over which material P or material Q overlaps the other is preferably 3 to 40 times, more preferably 5 to 25 times, the thickness of the material P. So long as the length over which either of these materials overlaps the other is at least 3 times the thickness of the material P, the stacked part is less apt to suffer a considerable decrease in mechanical strength. In cases when that length does not exceed 40 times, the volume of the forming materials in the stacked part is not excessively large and the problem that a design thickness is not obtained is avoided.

Material P, which is pres-formed together with material Q by the basic production process or by Production Process 1 or 2, preferably is one which has a hole in a portion thereof that comes into contact with the recess of the recessed die when the forming dies are closed, or is one which has an incision in a portion thereof that comes into contact with the recess of the recessed die when the forming dies are closed. In other words, it is preferable that in the basic production process or in Production Process 1 or Production Process 2, the platy forming material P should have a hole, an incision, or both and this platy forming material P should be disposed in the forming dies so that after the forming dies have been closed, the hole or the incision or both of the platy forming material P are in contact with the recess of the recessed die. There are no particular limitations on the number of holes or incisions in material P and on the depth, size, and shape of each hole or incision.

It is preferable that the hole possessed by the platy forming material P should be a hole having a size in the range of 5 to 150% of the projected area of the recess of the recessed die on which the material P is disposed, the projected area being measured through projection toward the bottom direction. With respect to Production Process 1, it is preferable that the platy forming material P should have a hole having a size in the range of 5 to 150% of the projected area of the recess of the lower die on which the material P is disposed, the projected area being measured through projection toward the bottom direction. With respect to Production Process 2, it is preferable that the platy forming material P should have a hole having a size in the range of 5 to 150% of the projected area of the recess of the upper die, the projected area being measured through projection toward the bottom direction, because use of this platy forming material P in the forming is less apt to result in the occurrence of irregular shapes, rendering the setting of forming conditions easier. The range of the size of the hole possessed by the platy forming material P is preferably 10 to 150%, more preferably 10 to 80%.

In the case where material P has a hole, the volume of material Q is preferably at least 0.4 times, more preferably 0.4 to 5 times, even more preferably 1 to 1.5 times, the volume of the hole formed in the material P. So long as the volume of material Q is at least 0.4 times the volume of the hole formed in material P, a shortage in forming material is less apt to occur. So long as the volume thereof is 5 times or less, an excess in forming material does not occur and a design thickness is apt to be attained. From the standpoint of the volume of the FRCM shaped product to be obtained, the volume of material Q is preferably 1 to 1.5 times, more preferably 1 to 1.2 times, a design value of the volume of the well-shaped part of the FRCM shaped product to be produced (that volume being the volume of the wall (indicated by 4 in FIG. 1) and bottom (indicated by 3 in FIG. 1) of the well-shaped part; hereinafter sometimes referred to simply as "volume of the well-shaped part").

Figure 8:
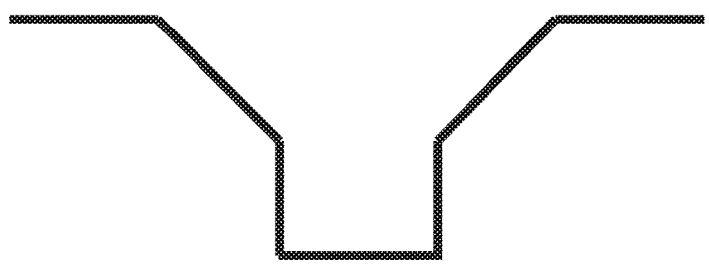
FIG. 8 is a side view which illustrates an example of shaped products having a two-stage opening.

Production Process 1 may be performed in the following manner. After cold press forming is conducted once, the forming dies are opened, and material Q which is the same as or different from the material Q used in the first cold press forming is disposed over the recess of the lower die so that at least a part thereof overlaps the surface-shaped part of the shaped product obtained by the first cold press forming. Cold press forming is then performed again. This production process is especially suitable for, for example, producing an FRCM shaped product having a well-shaped part with a multistage wall (example: FIG. 8).

[Cold Press Forming]

A preferred process for producing the FRCM shaped product, as an embodiment of the invention, is a production process which includes cold press forming as in the basic production process or in Production Processes 1 to 3. Cold press forming is a technique in which a forming material in the state of having been heated to or above the softening temperature is disposed in press-forming dies having a temperature lower than the softening temperature of the forming material and the dies are closed by performing the operation of lowering at least one of the upper die and raising the lower die, thereby obtaining a shaped product of a desired shape.

In the cold press forming of the material P and material Q in the production process of the invention, it is preferable that these forming materials each in the state of having been heated to a temperature that is not lower than the softening temperature thereof but is lower than the decomposition temperature in the air of the thermoplastic resin as the matrix of the forming material should be disposed in the press-forming dies and the dies are then closed.

The softening temperature of material P or material Q preferably is the melting point of the thermoplastic resin as the matrix when the thermoplastic resin is crystalline, or is the glass transition temperature of the thermoplastic resin when the thermoplastic resin is amorphous. The temperature of the press-forming dies at the time when the forming materials are disposed therein is lower than the softening temperature of each forming material, and is desirably (softening temperature)−10° C. or lower, preferably (softening temperature)−20° C. or lower, more preferably (softening temperature)−10° C. or lower but (softening temperature)−200° C. or higher, even more preferably (softening temperature)−20° C. or lower but (softening temperature)−200° C. or higher.

In the invention, the pressing pressure in the cold press forming is preferably 0.1 to 100 MPa, more preferably 0.2 to 60 MPa, even more preferably 0.5 to 30 MPa.

[Tensile Elongation at Break εv]

The tensile elongation at break εv (%) of material Q is the elongation of the material Q that has a temperature at which cold press forming is possible, i.e., at which the material is in a plasticated state, and that is elongated at a pulling speed of 20 mm/sec. The tensile elongation at break εv (%) thereof is expressed by the following expression (a).

$$\varepsilon v = 100 \times (\text{length of platy material } Q \text{ after elongation} \\ (y))/(\text{length of platy forming material } Q \text{ before} \\ \text{elongation } (x)) \quad \text{expression } (a)$$

Figure 7A:
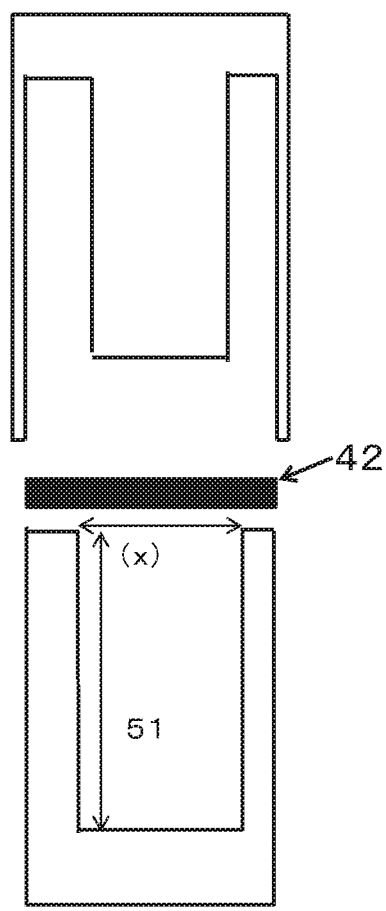
FIG. 7A and FIG. 7B are schematic views which illustrate a measurement of tensile elongation at break εv.
Figure 7B:
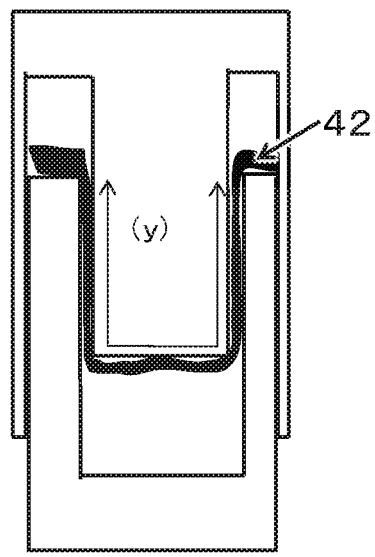

Specifically, material Q is heated to a temperature at which cold press forming is possible, and is then disposed on one of the press-forming dies for measuring tensile elongation at break εv shown in FIG. 7. The forming dies are closed at a forming-die closing rate of 20 mm/sec until the material Q breaks. Thereafter, the material Q is taken out, and the length by which the material Q has elongated (indicated by y in FIG. 7B) is measured. This length is divided by the length of the material Q before the elongation (indicated by x in FIG. 7A) to calculate the tensile elongation at break εv. The temperature at which cold press forming is possible is a temperature not lower than the softening temperature of the thermoplastic resin contained in the material Q, and is preferably from the softening temperature to (softening temperature)+70° C., more preferably from (softening temperature)+20° C. to (softening temperature)+60° C.

The tensile elongation at break εv of material Q is affected by the content of reinforcing fibers, the fiber length and single-fiber diameter thereof, the melt viscosity of the thermoplastic resin as the matrix, etc. Consequently, material Q having a given tensile elongation at break εv can be obtained by suitably regulating these factors.

[Tensile Elongation at Break εv and Shape of the Opening]

In a process for producing the FRCM shaped product, as an embodiment of the invention, there is a possibility that forming material Q might generate wrinkles or breaks upon reception of tension during the press forming to give an FRCM shaped product in which the well-shaped part has irregular-shape portions, in case where the tensile elongation at break εv (%) of the material Q, the projected distance L between outlet ends of either the recess of the lower die in Production Process 1 or the recess of the upper die in Production Process 2, and the creeping dimension corresponding to the projected distance in the case where the recess has a single cross-sectional shape (or the maximum creeping dimension, in the case where the recess has different cross-sectional shapes and different creeping dimensions depending on portions therein) D do not satisfy D−L×εv/100>0.

The tensile elongation at break εv of the forming material Q is preferably 105 to 400%.

Namely, material Q having a tensile elongation at break εv of 105 to 400% is apt to be drawn into the recess of a forming die when producing an FRCM shaped product having a well-shaped part and a surface-shaped part, such as that shown in FIG. 1, and is suitable for forming the well-shaped part of such an FRCM shaped product.

The tensile elongation at break εv of material Q is more preferably 105 to 260%, even more preferably 110 to 230%.

[Tension Relaxation Structure in Production Process 3]

With respect to Production Process 3, it is preferable that the portion where material Q has a tension relaxation structure should be a portion where tension is imposed on the material Q when the material Q comes into contact with the forming dies during the cold press forming.

Figure 5B:
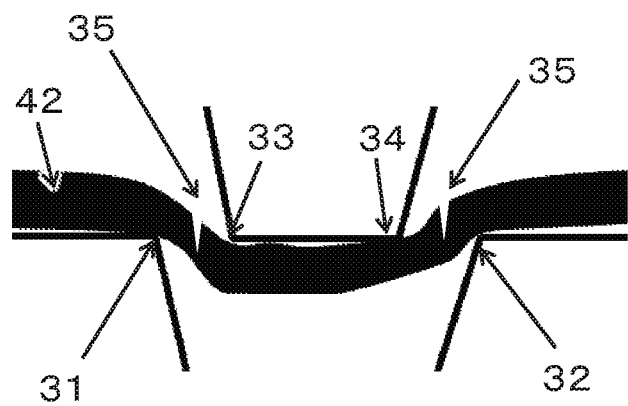
FIG. 5B and FIG. 5C are enlarged views of the broken-line-surrounded portion of FIG. 5A2, and are diagrammatic views which show examples of an incised forming material.
Figure 5C:
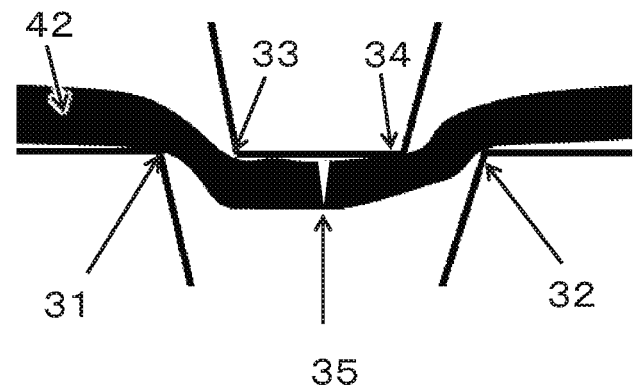

The portion where tension is imposed on the material Q is, for example, any of portions shown in FIG. 5B and FIG. 5C, i.e., a portion lying between 31 and 33 in FIG. 5B, a portion lying between 34 and 35 in FIG. 5B, and a portion lying between 33 and 34 in FIG. 5B.

At such a portion which receives tension, the forming material is prone to develop irregular shapes such as wrinkles when the forming dies are closed. Since the portion where wrinkles have occurred has a larger thickness than portions where no wrinkles have occurred, a higher pressure for compression is necessary for the winkled portion then for the portions having no wrinkles. Because of this, the pressing pressure during the cold press forming is less apt to be applied to the portions having no wrinkles, resulting in thickness unevenness or die surface transfer failure or in the occurrence of irregular-shape portions such as voids.

In Production Process 3, the occurrence of irregular-shape portions can be inhibited by disposing a tension relaxation structure in a portion where material Q receives tension in two or more directions when the material Q comes into contact with the forming dies, for example, when the upper die comes into contact with the material Q. Thus, a shaped product having a satisfactory appearance is obtained.

(Examples of the Tension Relaxation Structure)

The tension relaxation structure possessed by material Q in Production Process 3 is not particularly limited. Examples thereof include incisions (indicated by 35 in FIG. 5B and 35 in FIG. 5C) and holes (FIG. 6D). In particular, holes are preferred because of the simplicity thereof from the standpoint of operation.

There are no particular limitations on the shape or size of a hole as a tension relaxation structure of material Q. However, a preferred tension relaxation structure, in the case where material Q is subjected to press forming to obtain an FRCM shaped product, is an incision formed in a portion of the material Q which approximately comes into contact with the peripheral edge of the opening of the recess of a forming die (FIG. 6B) or a hole formed in a portion of the material Q which approximately comes into contact with the opening of the recess of a forming die (FIG. 6D).

Figure 2C:
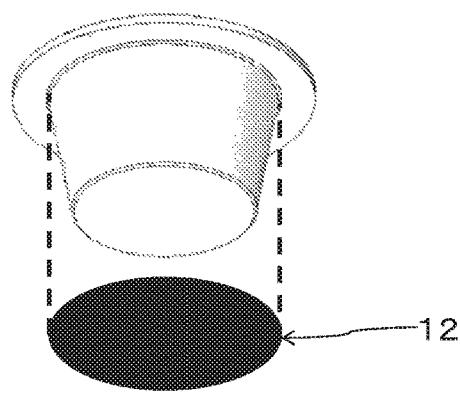
FIG. 2C is a view which schematically shows the projected area of the well-shaped part (the area of the well-shaped part projected toward the bottom direction) according to the invention.

With respect to the area of the hole as a tension relaxation structure of material Q, the area thereof is preferably 5 to 150% of the projected area of the opening (indicated by 12 in FIG. 2C). In cases when the area of the hole is at least 5% of the opening area, this hole can sufficiently exhibit the effect of a tension relaxation means. Conversely, in cases when the area thereof is 150% or less, a shortage in the amount of the material Q is less apt to occur and the shaped product is less apt to have a shortage in the volume of the well-shaped part. The area of the hole is preferably 10 to 150%, more preferably 10 to 80%, of the projected area of the opening.

Figure 3:
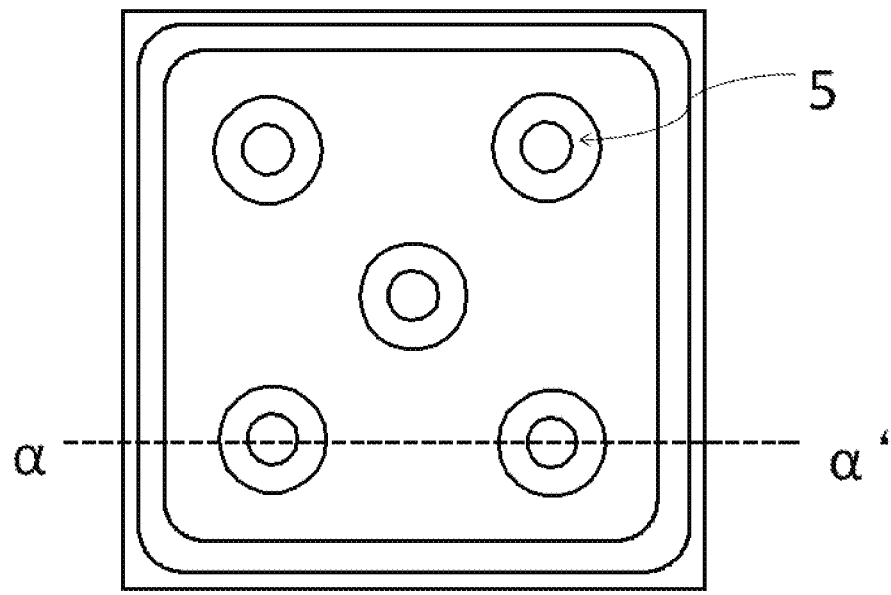
FIG. 3 is a plan view which shows an example of the FRCM shaped product of the invention, the example including well-shaped parts and a surface-shaped part.
Figure 4:
FIG. 4 is a side view which shows the example of the shaped product of the invention shown in FIG. 3 that includes well-shaped parts and a surface-shaped part, viewed from the side facing the α-α' direction cross-section.

In the case where, for example, an FRCM shaped product having a plurality of well-shaped parts, such as that shown in FIG. 3, is to be obtained, a preferred method is as follows. Material Q is disposed on the lower die of forming dies, and the upper die of the forming dies is brought into contact with the forming material to ascertain the possibility of the occurrence of tension and irregular-shape portions, such as wrinkles, form the degree of distortion of the material Q, etc. The shapes, areas, etc. of the holes suitable as tension relaxation structures are then designed. This method is preferred because the material Q is made to give an FRCM shaped product having better properties including appearance.

When an FRCM shaped product having a rather large depth E of the well-shaped part or a rather large creeping dimension D is to be produced by Production Process 3, there are cases where even when material Q having a tension relaxation structure is used to carry out Production Process 3, the press forming undesirably results in an FRCM shaped product in which the well-shaped part has a rather small wall thickness or a shaped product in which the wall has voids therein.

(Pressure Conditions)

In a process for producing the FRCM shaped product, as on aspect of the invention, the one or more forming materials are inhibited from developing an irregular-shape portion. Consequently, the desired shaped product can be obtained at a low forming pressure within the preferred range of pressing pressures shown above. Specific pressing conditions in the forming include a forming pressure of preferably 0.1 to 20 MPa, more preferably 0.2 to 15 MPa, even more preferably 0.5 to 10 MPa. In cases when the forming pressure is 0.1 MPa or higher, the forming material(s) can be sufficiently pushed in and the material strength does not decrease even when spring back or the like occurs. Such forming pressures are hence preferred. So long as the forming pressure is 20 MPa or less, a large pressing machine is not necessary even when, for example, the forming material is large. Such forming pressures are hence preferred from the standpoint of profitability. The conditions shown above are especially suitable for Production Process 3.

(Forming-die Temperature Conditions during Forming)

In a process for producing the FRCM shaped product, as one aspect of the invention, the temperature of the forming dies during the forming is not limited so long as the thermoplastic resin in a molten state is cooled and solidified to obtain a shaped product, although the temperature thereof depends on the kind of the thermoplastic resin. As stated above, it is preferable that the temperature of the forming dies should be lower by at least 20° C. than the softening temperature of the thermoplastic resin contained in each forming material. For example, in the case of nylon-6, nylon-66, nylon-610, and the like, the temperature of the forming dies is usually 120 to 180° C., preferably 125 to 170° C., more preferably 130 to 160° C. These conditions are especially suitable for Production Process 3.

[Shape of the Shaped Product to be produced]

The FRCM shaped product of the invention is not particularly limited in the shape thereof so long as the shaped product has a well-shaped part and a surface-shaped part. Examples thereof include a shaped product having a plurality of well-shaped parts, such as that shown in FIG. 1.

EXAMPLES

Examples are shown below, but the invention should not be construed as being limited to the following Examples.

The values of properties in the Examples were determined by the following methods. The reinforcing fibers used in each of the following Production Examples, Examples, and Comparative Examples are carbon fibers. There are cases where reinforcing-fiber areal weight is referred to as carbon-fiber areal weight, reinforcing-fiber volume content is referred to as carbon-fiber volume content, and total reinforcing-fiber amount is referred to as total carbon-fiber amount, for convenience.

(1) The average fiber length of carbon fibers was determined by heating the forming material having a size of a 100-mm square to 500° C. to remove the resin, randomly extracting 300 carbon fibers from the residual mat-shaped carbon-fiber structure, measuring the fiber length of each of the 300 carbon fibers with a caliper down to the order of mm, and averaging the measured lengths. Since the carbon fibers used in each of the following Production Examples and Examples had been cut into an even length, the number-average fiber length of the carbon fibers was calculated and the value obtained was regarded as the weight-average fiber length. The average thickness of carbon fibers and the weight-average fiber width thereof were determined by measuring the thickness, width, and weight of 300 carbon fibers randomly extracted from the carbon-fiber structure, with a caliper down to the order of mm.

(2) The analysis and measurements concerning the number of single carbon fibers in a forming material were made by a method according to the method described in U.S. Pat. No. 8,946,342, with respect to 300 carbon fibers collected from a forming-material sample having a size of a 100-mm square.

(3) For evaluating an FRCM shaped product, the appearance thereof was visually examined and the shaped product was further examined for voids by cutting the shaped product so as to obtain a cross-section including the surface-shaped part and well-shaped part thereof, polishing the resultant cross-section, and examining the polished cross-section.

A more specific procedure for examining the cross-section is as follows. The cross-section of the shaped product was polished with sand papers having roughnesses of #600, "800, #1000, and #2000, subsequently cleaned by ultrasonic cleaning, and then mirror-finished by buffing. Thereafter, a portion of the cross-section which ranged from the well-shaped part to the stacked part was examined with an electron microscope at a magnification of 100 diameters, with respect to arbitrarily selected 20 sites. The term "stacked part" means the portion in which a layered structure is obtained and which is attributable to the portion where, during the forming for producing the FRCM shaped product, the platy forming material P or the platy forming material Q overlapped the other in the dies.

The results of evaluation of the FRCM shaped products obtained in the Examples and Comparative Examples are shown in Table 1. The expression "good" for the results of evaluation in Table 1 means that the FRCM shaped product obtained had such a satisfactory surface state that the appearance had no irregular-shape portions such as wrinkles, considerable thickness unevenness, die surface transfer failure, holes, weld marks, etc., and that also in the examination of the cross-section of the portion ranging from the well-shaped part to the surface-shaped part, irregular-shape portions such as many voids and weld marks at the boundary edge between the well-shaped part and the surface-shaped part were not observed and it was ascertained that a layer of the fiber-reinforced composite material extended from the well-shaped part to the surface-shaped part.

In the examination of cross-sections of the FRCM shaped products of the Examples which will be described later, no voids were observed at all.

(4) Evaluation of Tensile Elongation at Break εv

Tensile elongation at break was evaluated by the following original evaluation method with respect to Production Examples 1 and 2, and was evaluated by the following simplified evaluation method with respect to Production Examples 3 to 7.

(4-1) Initial Evaluation Method

Each of the various forming materials which will be described later was cut into a size of 200 mm (length)×25 mm (width), dried in a 120° C. hot-air drying oven for 4 hours, and then heated to 300° C. with an infrared heater. Subsequently, the forming dies shown in FIG. 7A which had a depth (indicated by 51 in FIG. 7) of 200 mm, an opening length of 50 mm, and a clearance between the upper and lower dies of 3.0 mm were prepared and set at 140° C. The forming material which had been cut and brought into the heated state as described above was disposed on the lower die so as to cover the opening, and the forming dies were closed at a die closing rate of 20 mm/sec using a 200-ton servo pressing machine manufactured by HODEN SEIMITSU KAKO KENKYUSHO CO., LTD. The dies were closed until the forming material broken. Thereafter, the forming material was taken out, and the length (y) to which the forming material had elongated was measured. This measured value was divided by the length (x) of the forming material before the elongation and multiplied by 100 to calculate the tensile elongation at break εv (%). The length (x) of the forming material before the elongation was taken as the opening length of 50 mm.

In Production Examples 1 and 2, the forming materials which had been cut and heated to 300° C. had, at the time when the forming materials were disposed in the forming dies, a temperature that had declined to 260° C. in Production Example 1 or declined to 280° C. in Production Example 2. However, the forming materials were each in the state of being capable of cold press forming.

(4-2) Simplified Evaluation Method

A forming material was cut into a size of 120 mm (length)×20 mm (width) and dried in a 120° C. hot-air drying oven for 4 hours to obtain a forming-material sample. A heat-resistant tape (pressure-sensitive adhesive tape VAL-FLON, manufactured by Nippon Valqua Industries, Ltd.) was wound double around each of both ends of the forming-material sample to form tabs. Thus, a test piece having a tab-to-tab distance of 70 mm was produced.

A thermocouple for temperature measurement was attached to the test piece, and this test piece was heated in a hot-air circulating oven to a give temperature capable of cold pressing. The test piece heated to the temperature capable of cold pressing was taken out of the oven and the following series of operations was rapidly performed, before the test piece cooled to a temperature at which cold pressing was impossible. Thus, the tensile elongation at break εv (%) was determined.

- The thermocouple was detached from the heated test piece, and the tab part at one end of the test piece was fixed with a clamp-shaped fixture equipped with a ruler.
- The tab part at the other end of the test piece, one end of which had been fixed, was pinched with a pliers type tool having a width of 20 mm, and this test piece was manually stretched until a break at a speed of 20 mm/sec in time to a 1-sec metronome while watching the graduations on the ruler and measuring the lapse of time with a stopwatch. The tab-to-tab distance (y) in the test piece at the time when a break occurred was measured.
- The tab-to-tab distance (y) in the test piece at the time when a break occurred was divided by the tab-to-tab distance before the stretching (x), i.e., 70 mm, and the resultant value was multiplied by 100 to calculate the tensile elongation at break εv (%).

The temperatures capable of cold pressing in Production Examples 3 to 7 are 260° C., 240° C., 280° C., 260° C., and 235° C., respectively.

In cases when this simplified evaluation method is used for determining the tensile elongation at break of a small forming material or of the well-shaped part of an FRCM shaped product and when it is difficult to cut out thereof a sample having the size of 120 mm (length)×20 mm (width), then a smaller test piece of a size having the same length-width ratio, such as 60 mm (length)×10 mm (width), may be cut out and subjected to the measurement.

(5) Forming Dies

For obtaining FRCM shaped products each having a well-shaped part and a surface-shaped part in the Examples which will be given layer, use was made of forming dies that were configured of a lower die having a square shape of 150 mm×150 mm and having both a recess which lay at the center of the square shape and corresponded to the shape of the well-shaped part of the desired FRCM shaped product {the well-shaped part had the shape of an inverted truncated cone and had a hollow; the opening (indicated by 11 in FIG. 2B) of the surface-shaped part which communicated therewith had a circular shape with a diameter of 60 mm; the bottom (indicated by 13 in FIG. 2B) of the opening had a circular shape with a diameter of 30 mm; and the well-shaped part had a depth (indicated by E in FIG. 2B) of 60 mm and an external-surface area of 9,450 mm$^2$} (the recess having an opening distance L between outlet ends of 60 mm and a creeping dimension D of 154 mm) and a non-recess part and an upper die having a protrusion corresponding to the shape of the well-shaped part, and that had been designed to have a clearance between the upper and lower dies, i.e., a forming-cavity thickness, of 2.5 mm. The periphery of the forming cavity, when viewed from the die closing direction, has a square shape of 150 mm×150 mm, as apparent from the above explanation. Water pipes for heating/cooling had been disposed in the forming dies, and the forming dies were capable of being regulated, with a pressurized water type temperature controller for forming dies, so as to have a temperature suitable for cold press forming.

(6) Forming Machine and Forming Conditions

For obtaining FRCM shaped products each having a well-shaped part and a surface-shaped part in the Examples which will be given later, use was made of a 200-ton servo pressing machine manufactured by HODEN SEIMITSU KAKO KENKYUSHO CO., LTD., which had a die closing force of 200 tons. The forming dies (upper die and lower die) were attached to the surbo pressing machine, and the forming dies were kept at 150° C. One or more given forming materials were disposed on the lower die, and the upper die was lowered. The dies were kept for 30 seconds at such a die closing pressure that the pressure applied to the forming material(s) was 15 MPa. Thus, press forming was conducted. During the press forming, the rate of lowering the upper die was 10 mm/sec, and the pressure-elevating rate was 1 sec.

Production Example 1

As reinforcing fibers, use was made of carbon fibers "Tenax" (registered trademark) STS40-24K (average single-fiber diameter, 7 μm; number of single fibers, 24,000; density, 1.75 g/cm$^3$), manufactured by Toho Tenax Co., Ltd., which had been cut to a weight-average fiber length of 20 mm. As a thermoplastic resin serving as a matrix, use was made of nylon-6 resin A1030 (crystalline resin; melting point, 225° C.; heat decomposition temperature in the air, 300° C.; density 1.14 g/cm$^3$), manufactured by Unichika, Ltd. In accordance with the method described in U.S. Pat. No. 8,946,342, the carbon fibers and the nylon-6 resin were used to produce a carbon fiber/nylon-6 resin mixture mat which had a carbon-fiber areal weight of 1,593 g/m$^2$ and a nylon-6-resin areal weight of 1,926 g/m$^2$ and in which the carbon fibers had been randomly oriented two-dimensionally.

The mat obtained was heated with a pressing device heated to a mold temperature of 260° C., at 2.0 MPa for 5 minutes. Thus, a forming material C1 including a fiber-reinforced composite material C and having an average thickness of 2.6 mm was obtained.

With respect to the forming material C1 obtained, the carbon fibers contained therein were analyzed. As a result, the following were found: the critical number of single fibers defined by expression (1) was 86; the average number of single fibers (N) in carbon fibers (A) made up of carbon fibers not less than the critical number of single fibers was 820; the proportion of the carbon fibers (A) made up of carbon fibers not less than the critical number of single fibers was 80 vol % of all the carbon fibers; the forming material C1 included not only carbon fibers made up of carbon fibers less than the critical number of single fibers but also carbon fibers in the form of independent single fibers, besides the carbon fibers (A); and the carbon fibers (A) and the carbon fibers made up of carbon fibers less than the critical number of single fibers were each a mixture of carbon fiber bundles differing in the number of single fibers. The volume content of carbon fibers was 35%. The forming material C1 had a tensile elongation at break εv of 117%.

Production Example 2

The same procedure as in Production Example 1 was conducted, except that the feed ratio between the carbon fibers and the nylon-6 resin during the mixture mat production was changed and the degree of opening of the carbon fibers was suitably regulated, thereby obtaining a mixture mat which had a carbon-fiber areal weight of 980 g/m$^2$ and a nylon-6-reisn areal weight of 1,185 g/m$^2$ and in which the carbon fibers included carbon fibers (A) in a low proportion and free single carbon fibers in a high proportion. Thus, a forming material C2 including a fiber-reinforced composite material C and having an average thickness of 1.6 mm was produced.

With respect to the forming material C2 obtained, the carbon fibers contained therein were analyzed. As a result, the following were found: the critical number of single fibers defined by expression (1) was 86; the average number of single fibers (N) in carbon fibers (A) was 420; the proportion of the carbon fibers (A) was 30 vol % of all the carbon fibers; the forming material C2 included not only carbon fibers made up of carbon fibers less than the critical number of single fibers but also carbon fibers in the form of independent single fibers, besides the carbon fibers (A); and the carbon fibers (A) and the carbon fibers made up of carbon fibers less than the critical number of single fibers were each a mixture of carbon fiber bundles differing in the number of single fibers. The volume content of carbon fibers was 35%. The forming material C2 had a tensile elongation at break εv of 165%.

Production Example 3

The same procedure as in Production Example 1 was conducted, except that "UBE Nylon" (registered trademark) 1015B, manufactured by Ube Industries, Ltd., was used as a nylon-6 resin, the feed ratio between the carbon fibers and the nylon-6 resin during the mixture mat production was charged, and the degree of opening of the carbon fibers was suitably regulated, thereby obtaining a mixture mat which had a carbon-fiber areal weight of 1,530 g/m$^2$ and a nylon-6-resin areal weight of 1,853 g/m$^2$. Thus, a forming material C3 including a fiber-reinforced composite material C and having an average thickness of 2.5 mm was obtained.

With respect to the forming material C3 obtained, the carbon fibers contained therein were analyzed. As a result, the following were found: the critical number of single fibers defined by expression (1) was 86; the average number of single fibers (N) in carbon fibers (A) made up of carbon fibers not less than the critical number of single fibers was 40; the proportion of the carbon fibers (A) made up of carbon fibers not less than the critical number of single fibers was 45 vol % of all the carbon fibers; the forming material C3 included not only carbon fibers made up of carbon fibers less than the critical number of single fibers but also carbon fibers in the form of independent single fibers, besides the carbon fibers (A); and the carbon fibers (A) and the carbon fibers made up of carbon fibers less than the critical number of single fibers were each a mixture including carbon fibers differing in the number of single fibers. The volume content of carbon fibers (volume content of reinforcing fibers) was 35%. The forming material C3 had a tensile elongation at break εv of 246%.

Production Example 4

The same procedure as in Production Example 1 was conducted, except that the feed ratio between the carbon fibers and the nylon-6 resin during the mixture mat production was changed and the degree of opening of the carbon fibers was suitably regulated, thereby obtaining a mixture mat which had a carbon-fiber areal weight (reinforcing-fiber areal weight) of 1,050 g/m$^2$ and a nylon-6-reisn areal weight of 1,596 g/m$^2$. Thus, a forming material C4 including a fiber-reinforced composite material C and having an average thickness of 2.0 mm was produced.

With respect to the forming material C4 obtained, the carbon fibers contained therein were analyzed. As a result, the following were found: the critical number of single fibers defined by expression (1) was 86; the average number of single fibers (N) in carbon fibers (A) made up of carbon fibers not less than the critical number of single fibers was 50; the proportion of the carbon fibers (A) made up of carbon fibers not less than the critical number of single fibers was 60 vol % of all the carbon fibers; the forming material C4 included not only carbon fibers made up of carbon fibers less than the critical number of single fibers but also carbon fibers in the form of independent single fibers, besides the carbon fibers (A); and the carbon fibers (A) and the carbon fibers made up of carbon fibers less than the critical number of single fibers were each a mixture including carbon fibers differing in the number of single fibers. The volume content of carbon fibers was 30%. The forming material C4 had a tensile elongation at break εv of 294%.

Production Example 5

Pellets of polycarbonate resin "Panlite" (registered trademark) L-1225L (amorphous resin; glass transition temperature, 145 to 150° C.; heat decomposition temperature in the air, 350° C.; density, 1.20 g/cm$^3$), manufactured by Teijin Ltd., were freeze-pulverized and classified with 20-mesh and 100-mesh sieves to obtain a resin powder having an average particle diameter of about 710 μm. The same procedure as in Production Example 1 was conducted except that the resin powder obtained above was used as a thermoplastic resin serving as a matrix, the feed ratio between the carbon fibers and the thermoplastic resin was changed, and the degree of opening of the carbon fibers was suitably changed, thereby obtaining a mixture mat having a carbon-fiber areal weight of 1,225 g/m$^2$ and a polycarbonate-resin areal weight of 1,560 g/m$^2$, and that the mold temperature of the pressing device was changed to 280° C. Thus, a forming material C5 including a fiber-reinforced composite material C and having an average thickness of 2.0 mm was obtained.

With respect to the forming material C5 obtained, the carbon fibers contained therein were analyzed. As a result, the following were found: the critical number of single fibers defined by expression (1) was 86; the average number of single fibers (N) in carbon fibers (A) made up of carbon fibers not less than the critical number of single fibers was 400; the proportion of the carbon fibers (A) made up of carbon fibers not less than the critical number of single fibers was 50 vol % of all the carbon fibers; the forming material C5 included not only carbon fibers made up of carbon fibers less than the critical number of single fibers but also carbon fibers in the form of independent single fibers, besides the carbon fibers (A); and the carbon fibers (A) and the carbon fibers made up of carbon fibers less than the critical number of single fibers were each a mixture including carbon fibers differing in the number of single fibers. The volume content of carbon fibers was 35%. The forming material C5 had a tensile elongation at break εv of 217%.

Production Example 6

The same procedure as in Production Example 1 was conducted, except that the feed ratio between the carbon fibers and the nylon-6 resin during the mixture mat production was changed and the degree of opening of the carbon fibers was suitably regulated, thereby obtaining a mixture mat which had a carbon-fiber areal weight of 1,400 g/m² and a nylon-6-reisn areal weight of 1,368 g/m². Thus, a forming material C6 including a fiber-reinforced composite material C and having an average thickness of 2.0 mm was obtained.

With respect to the forming material C6 obtained, the carbon fibers contained therein were analyzed. As a result, the following were found: the critical number of single fibers defined by expression (1) was 86; the average number of single fibers (N) in carbon fibers (A) made up of carbon fibers not less than the critical number of single fibers was 780; the proportion of the carbon fibers (A) made up of carbon fibers not less than the critical number of single fibers was 80 vol % of all the carbon fibers; the forming material C6 included not only carbon fibers made up of carbon fibers less than the critical number of single fibers but also carbon fibers in the form of independent single fibers, besides the carbon fibers (A); and the carbon fibers (A) and the carbon fibers made up of carbon fibers less than the critical number of single fibers were each a mixture including carbon fibers differing in the number of single fibers. The volume content of carbon fibers was 30%. The forming material C6 had a tensile elongation at break εv of 117%.

Production Example 7

The forming material C3 obtained in Production Example 3 was cut with a cutter into flakes having an average size of 6 mm×6 mm×2 mm. These flakes were melt-kneaded together with pellets of nylon-6 resin "UBE Nylon" (registered trademark) 1015B, manufactured by Ube Industries, Ltd., to produce fiber-reinforced resin pellets having an approximately cylindrical shape with a size of 2 mm (diameter)×3 mm (length).

These fiber-reinforced resin pellets were injection-molded using an injection molding machine (JSW180H, manufactured by The Japan Steel Works, Ltd.) to which a mold for flat plate production (120 mm×120 mm×3 mm; mold temperature, 90° C.) had been attached. Thus, a forming material C7 including a fiber-reinforced composite material and having a flat plate shape with an average thickness of 3.0 mm was produced.

The carbon fibers in this forming material C7 had a weight-average fiber length of 0.3 mm, and the forming material C7 had a carbon-fiber volume content of 15%. The critical number of carbon fibers defined by expression (1) was 86, and there were no carbon fibers (A) made up of carbon fibers not less than the critical number of single fibers. The forming material C7 had a tensile elongation at break εv of 540%.

Example 1

A platy forming material P and a platy forming material Q (hereinafter often abbreviated to "material P" and "material Q", respectively) were obtained from the forming material C1 obtained in Production Example 1, and were subjected to cold press forming to produce an FRCM shaped product having a well-shaped part and a surface-shaped part.

Figure 6F:
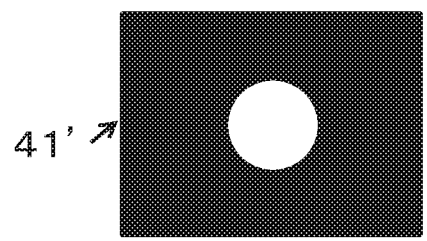
FIG. 6F illustrates the platy forming material having a round hole which is used in the press forming shown by FIG. 6E.

Specifically, the forming material C1 was first cut into a piece of 145 mm×145 mm. A hole having a diameter of 30 mm was formed in the piece cut out of the forming material C1, in a portion corresponding to the opening of the well-shaped part of the desired FRCM shaped product. This piece, as a platy forming material P (indicated by 41' in FIG. 6E and FIG. 6F), was dried in a 120° C. hot-air drying oven for 4 hours and then heated to 300° C. with an infrared heater.

Simultaneously with the operation described above, a disk-shaped piece having a diameter of 90 mm, an example of which is indicated by 42 in FIG. 6E, was cut out of the forming material C1, and this disk-shaped piece, as a platy forming material Q, was heated in the same manner as for the platy forming material P. This platy forming material Q has a volume corresponding to 74% of the design volume of the fiber-reinforced composite material C constituting the well-shaped part of the shaped product of the fiber-reinforced composite material.

The material P and material Q which had been heated as described above and were in the state of having a temperature not lower than the softening temperature were rapidly disposed in the forming dies in the following manner while preventing the materials P and Q from being cooled to below the softening temperature, and cold press forming was performed.
1) The material P is disposed on the non-recess part of the lower die of the forming dies so that the center of the hole thereof coincides with the center of the circular bottom of the recess of the lower die of the forming dies.
2) Furthermore, the material Q is disposed on the material P so that the center of the circular surface thereof coincides with the center of the hole of the material P thus disposed. The length over which the material Q overlaps the material P is about 12 times the thickness of the material P.

By performing cold press forming in the manner described above, an FRCM shaped product was obtained in which a layer of a fiber-reinforced composite material C derived from the platy forming material Q extended from the well-shaped part to the boundary edge between the well-shaped part and the surface-shaped part. The results of evaluation, etc. of this FRCM shaped product are shown in Table 1.

As stated above, the material Q obtained from the forming material C1 had an εv of 117%, the opening distance L between outlet ends of the recess of the lower die of the forming dies was 60 mm, and that internal creeping dimension D of the lower die which corresponded to the opening distance was 154 mm. Consequently, D−L×εv/100=154−60×117/100=83.8>0. In this Example, the relationship D−L×εv/100>0 is satisfied.

In this Example, the platy forming material P had a hole having a size that was 25% of the projected area, regarding projection toward the bottom direction, of the recess of the lower die on which the material P was disposed. The calculation formula is as follows.

100×(size (area) of the hole possessed by platy forming material P)/(projected area of the recess (regarding bottom-direction projection of the recess) of lower die)=100×{π/4×(30 mm)$^2$}/{π/4×(60 mm)$^2$}=100×(30 mm/60 mm)$^2$=25[%]

The FRCM shaped product of this Example is one in which, as apparent from the statement concerning the dies, the opening (indicated by 11 in FIG. 2B) of the surface-shaped part has a circular shape with a diameter of 60 mm and the hollow of the well-shaped part has a depth E (indicated by E in FIG. 2B) of 60 mm and which satisfies the expression (a diameter Φ of a circle having the same area as the hole area of the opening of the surface-shaped part)/2≤(a depth E of the hollow of the well-shaped part).

In the FRCM shaped product obtained in this Example, the ratio of the wall thickness t' of the well-shaped part to the thickness t of the surface-shaped part located in the vicinity of the boundary edge between the surface-shaped part and the well-shaped part, t'/t, was 2.5 mm/2.5 mm=1.0.

Example 2

Cold press forming was conducted in the same manner as in Example 1, except that the size of the hole of the material P was changed to 60 mm in diameter, the diameter of the material Q was changed to 90 mm, and the length over which the material Q overlapped the material P when the materials P and Q were disposed in the dies was changed to about 6 times the thickness of the material P. In this Example, the material P had a hole having a size that was 100% of the projected area, regarding projection toward the bottom direction, of the recess of the lower die on which the material P was disposed. The FRCM shaped product obtained was one in which a layer of a fiber-reinforced composite material C derived from the material Q extended from the well-shaped part to the boundary edge between the well-shaped part and the surface-shaped part. The results are shown in Table 1.

Example 3

Cold press forming was conducted in the same manner as in Example 1, except that the diameter of the material Q was changed to 140 mm and the length over which the material Q overlapped the material P when the materials P and Q were disposed in the dies was changed to about 21 times the thickness of the material P. In this Example, the material P had a hole having a size that was 25% of the projected area, regarding projection toward the bottom direction, of the recess of the lower die on which the material P was disposed. The FRCM shaped product obtained was one in which a layer of a fiber-reinforced composite material C derived from the material Q extended from the well-shaped part to the boundary edge between the well-shaped part and the surface-shaped part. The results are shown in Table 1.

Comparative Example 1

Cold press forming was conducted in the same manner as in Example 1, except that the size into which the forming material C1 was cut for obtaining a platy forming material P was changed to 350 mm×350 mm, the size of the hole of the material P was changed to 10 mm in diameter, the diameter of the material Q was changed to 310 mm, and the length over which the material Q overlapped the material P when the materials P and Q had been disposed in the dies was changed to about 57 times the thickness of the material P. In this Example, the material P had a hole having a size that was 2.8% of the projected area, regarding projection toward the bottom direction, of the recess of the lower die on which the material P was disposed. The results are shown in Table 1.

Comparative Example 2

Cold press forming was conducted in the same manner as in Example 1, except that the size of the hole of the material P was changed to 30 mm in diameter, the diameter of the material Q was changed to 40 mm, and the length over which the material Q overlapped the material P when the materials P and Q were disposed in the dies was changed to about 0.2 times the thickness of the material P. The results are shown in Table 1.

Comparative Example 3

Cold press forming was conducted in the same manner as in Example 1, except that the size of the hole of the material P was changed to 20 mm in diameter and that the material Q was omitted and the material P only was subjected to the cold press forming. The results are shown in Table 1.

Comparative Example 4

The same procedure as in Example 1 was conducted, except that the material Q was omitted and that not a hole but a cross-shaped incision having a length of 50 mm was formed in the piece cut out of the forming material C1 and the resultant material P only was subjected to cold press forming. The results are shown in Table 1.

Comparative Example 5

The same procedure as in Example 1 was conducted, except that the material Q was omitted and the piece cut out of the forming material C1 was used as such as material P, that is, the material P having neither a hole nor an incision was subjected alone to cold press forming. The results are shown in Table 1.

Example 4

The same procedure as in Example 1 was conducted, except that a platy forming material P and a platy forming material Q were obtained not from the forming material C1 obtained in Production Example 1 but from the forming material C3 obtained in Production Example 3, and that these platy forming materials were subjected to cold press forming. The results of evaluation, etc. of the shaped product are shown in Table 1.

Example 5

The same procedure as in Example 1 was conducted, except that a material P and a material Q were obtained not from the forming material C1 obtained in Production Example 1 but from the forming material C4 obtained in Production Example 4, and that the size of the hole of the material P was changed to 60 mm in diameter and the length over which the material Q overlapped the material P when the materials P and Q had been disposed in the dies was changed to 15 mm, which was 7.5 times the thickness of the material P, i.e., 2 mm. The results of evaluation, etc. of the shaped product are shown in Table 1.

Example 6

The same procedure as in Example 1 was conducted, except that a material P and a material Q were obtained not from the forming material C1 obtained in Production Example 1 but from the forming material C5 obtained in Production Example 5 and that these materials were subjected to cold press forming, and that since the thickness of the material P was 2 mm, the length of 30 mm over which the material Q overlapped the material P when the materials P and Q had been disposed in the forming dies was 15 times the thickness of the material P. The results of evaluation, etc. of the shaped product are shown in Table 1.

Example 7

The same procedure as in Example 1 was conducted, except that a material P and a material Q were obtained not from the forming material C1 obtained in Production Example 1 but from the forming material C6 obtained in Production Example 6, and that the size of the hole of the material P was changed to 60 mm in diameter and the length over which the material Q overlapped the material P when the materials P and Q had been disposed in the dies was changed to 15 mm, which was 7.5 times the thickness of the material P, i.e., 2 mm. The results of evaluation, etc. of the shaped product are shown in Table 1.

Comparative Example 6

The same procedure as in Example 1 is conducted, except that the material Q is omitted and that a piece cut out not of the forming material C1 obtained in Production Example 1 but of the forming material C7 obtained in Production Example 7 is used as such, without forming a hole or an incision therein, and subjected as material P to cold press forming. The shaped product obtained has such a satisfactory surface state that the appearance includes no irregular-shape portions such as wrinkles, considerable thickness unevenness, die surface transfer failure, and holes. Also in an examination of a cross-section of a portion ranging from the well-shaped part to the surface-shaped part of the shaped product, irregular-shape portions such as voids and weld marks at the boundary edge between the well-shaped part and the surface-shaped part are not observed. A multilayer structure composed of a layer of the fiber-reinforced composite material extending from the well-shaped part to the surface-shaped part and a layer of the fiber-reinforced composite material extending from the surface-shaped part to the well-shaped part is not observed in the portion ranging from the well-shaped part to the surface-shaped part of the shaped product, and the reinforcing fibers are evenly dispersed in this portion. The well-shaped part of the shaped product obtained has a tensile elongation at break εv of 540%, which is equal to the tensile elongation at break εv of the forming material C7.

The shaped product obtained in the Comparative Example includes carbon fibers which have a weight-average fiber length as short as 0.3 mm. Because of this, the shaped product of this Comparative Example is considerably inferior in strength, etc. to shaped products which have the same shape and the same carbon fiber/thermoplastic resin ratio as the shaped product of this Comparative Example and contain carbon fibers having a rather large weight-average fiber length of tens of millimeters and which are obtained by methods such as that shown in Example 1.

TABLE 1

|  | Results of evaluation of FRCM shaped product | Thickness of material P (mm) | Diameter of hole of material P (mm) | Diameter of material Q (mm) | Overlapping length of materials P and Q (mm) | (Overlapping length of materials P and Q)/(thickness of material P) | Proportion of material Q to the design volume of fiber-reinforced composite material C constituting well-shaped part |
|---|---|---|---|---|---|---|---|
| Example 1 | good | 2.6 | 30 | 90 | 30 | 12 | 74% |
| Example 2 | good | 2.6 | 60 | 90 | 15 | 6 | 74% |
| Example 3 | good | 2.6 | 30 | 140 | 55 | 21 | 179% |
| Comparative Example 1 | wrinkles were observed on surface of the shaped product | 2.6 | 10 | 310 | 150 | 57 | 879% |
| Comparative Example 2 | irregular shapes such as die surface transfer failure were observed on surface of the shaped product | 2.6 | 30 | 40 | 0.5 | 0.2 | 14.6% |
| Comparative Example 3 | irregular shapes such as die surface transfer failure were observed on surface of the shaped product | 2.6 | 20 | no material Q | — | — | — |
| Comparative Example 4 | irregular shapes such as die surface transfer failure were observed on surface of the shaped product | 2.6 | 50 (incision) | no material Q | — | — | — |
| Comparative Example 5 | irregular shapes such as die surface transfer failure were observed on surface of the shaped product | 2.6 | no hole or incision | no material Q | — | — | — |
| Example 4 | good | 2.5 | 30 | 90 | 30 | 12 | 74% |
| Example 5 | good | 2.0 | 60 | 90 | 15 | 7.5 | 74% |
| Example 6 | good | 2.0 | 30 | 90 | 30 | 15 | 74% |
| Example 7 | good | 2.0 | 60 | 90 | 15 | 7.5 | 74% |

Reference Examples 1 to 8

Evaluation of Overlapping Length

Figure 9A:
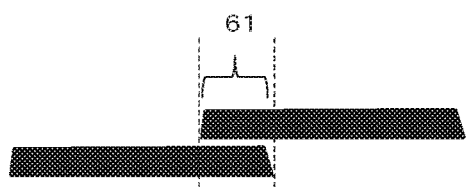
FIG. 9A is a schematic view of cold press forming in which two platy forming materials are used so as to overlap with each other, the view indicating the overlapping length of these platy forming materials.
Figure 9B:
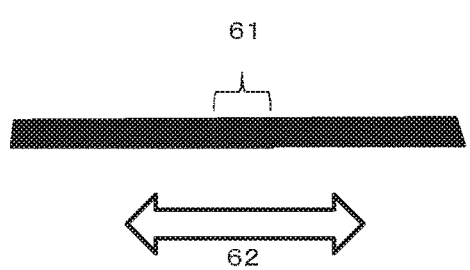
FIG. 9B is a schematic view which indicates the portion that corresponds to the overlapping length of the platy forming materials in FIG. 9A in a shaped product obtained by the cold press forming.
Figure 10:
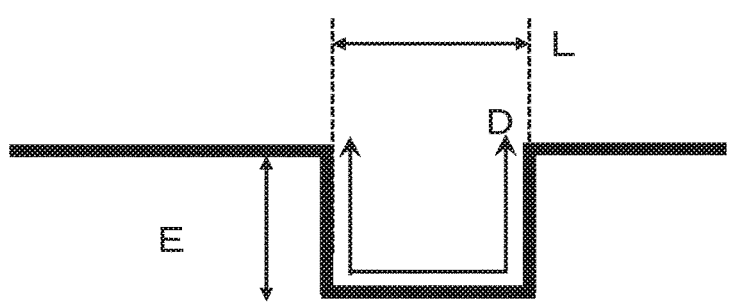
FIG. 10 is a cross-sectional view of a shaped product (example) obtained using the production process of the invention, and is a schematic view which shows a relationship between the projected distance L between outlet ends of the opening and the creeping dimension D corresponding to the projected distance.
Figure 11:
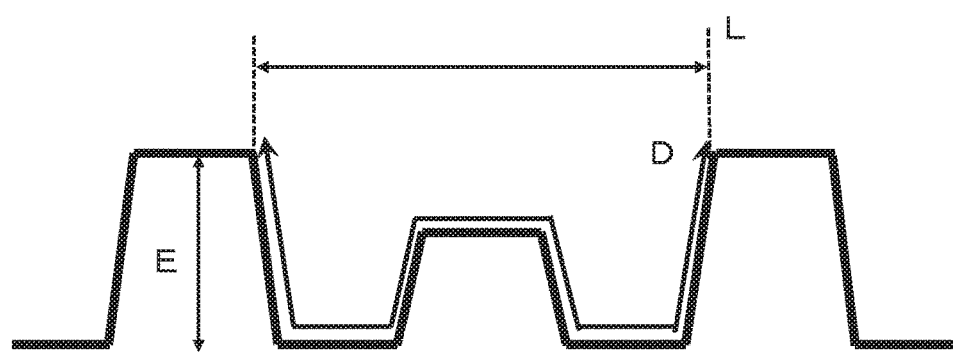
FIG. 11 is a cross-sectional view of a shaped product (example) obtained using the production process of the invention, and is a schematic view which shows a relationship between the projected distance L between outlet ends of the opening and the creeping dimension D corresponding to the projected distance.

The influence of the length over which either material P or material Q overlapped the other on the strength of the FRCM shaped product was evaluated in the following manner. Fiber-reinforced composite materials C were used to produce platy forming materials P' and platy forming materials Q', which corresponded to material P and material Q. These platy forming materials were subjected to cold press forming involving overlapping to produce flat plates. Bending test pieces each having a length of 100 mm and a width of 15 mm were cut out of the flat plates so that in the case of a flat plate having a stacked part, the stacked part lay at the length-direction center (the length direction being the direction indicated by 62 in FIG. 9). The test pieces were evaluated for bending property in accordance with JIS 7074 (1988), method A. In Table 2 are shown the thicknesses of the materials used, overlapping amounts thereof, and results of the bending test. In Reference Examples 1 to 6, the platy forming materials P' and the platy forming materials Q' were produced from the forming material C1 obtained in Production Example 1, while in Reference Examples 7 and 8, the platy forming materials P' and the platy forming materials Q' were produced from the forming material C2 obtained in Production Example 2.

[Production Process 4]

A process for producing a shaped product of a fiber-reinforced composite material by using forming dies in which a forming cavity is formed with an upper die and a lower die, disposing a platy forming material P including a thermoplastic-resin-based material and a platy forming material Q including a fiber-reinforced composite material C including both discontinuous reinforcing fibers and a thermoplastic resin, and then conducting cold press forming by performing the operation of at least one of lowering the upper die and raising the lower die, in which the platy forming material P and the platy forming material Q are disposed in the forming dies so that the material P and the material Q overlap with each other so as to result in (an overlapping length of the material P and the material Q)/(a thickness of the stacked part of the shaped product of the fiber-reinforced composite material to be obtained)≥3.

In Production Process 4, it is preferable that the platy forming material P also should be one including a fiber-reinforced composite material C including both discontinuous reinforcing fibers and a thermoplastic resin, and it is more preferable that the platy forming material P should include the same fiber-reinforce composite material C as that constituting the platy forming material Q. Preferred examples of the discontinuous reinforcing fibers and thermoplastic resin are as shown above with regard to the FRCM shaped product.

TABLE 2

|  | Thickness of material P' [mm] | Thickness of material Q' [mm] | Thickness of stacked part of shaped product [mm] | Overlapping length [mm] | Three-point bending strength [MPa] | (Overlapping length)/(thickness of stacked part of shaped product) |
| --- | --- | --- | --- | --- | --- | --- |
| Reference Example 1 | 2.6 | — | 2.6 | — (no material Q') | 473 | — |
| Reference Example 2 | 2.6 | 2.6 | 2.6 | 0 (weld) | 121 | — |
| Reference Example 3 | 2.6 | 2.6 | 2.6 | 5 | 145 | 1.9 |
| Reference Example 4 | 2.6 | 2.6 | 2.6 | 10 | 334 | 3.8 |
| Reference Example 5 | 2.6 | 2.6 | 2.6 | 25 | 407 | 9.6 |
| Reference Example 6 | 2.6 | 2.6 | 2.8 | 50 | 497 | 17.9 |
| Reference Example 7 | 1.6 | 1.6 | 1.6 | 15 | 334 | 9.3 |
| Reference Example 8 | 3.2 | 3.2 | 3.2 | 45 | 439 | 14.0 |

As shown above, in cases when a platy forming material P and a platy forming material Q which are in the state of overlapping with each other are subjected to cold press forming to obtain a shaped product of a fiber-reinforced composite material, the value of (an overlapping length of the material P and the material Q during cold press forming)/(a thickness of a stacked part in the shaped product obtained) is preferably 3 or larger because shaped products having excellent bending strength are obtained. The value thereof is more preferably 4 or larger, even more preferably 8 or larger. The thickness of the stacked part of the FRCM shaped product obtained can be regarded as a design value for that portion of the FRCM shaped product which corresponds to the part where either material P or material Q overlaps the other during cold press forming.

Namely, the present invention involves an invention relating to the following Production Process 4 for producing the FRCM shaped product.

In Production Example 4, the value of (overlapping length of material P and material Q)/(thickness of the stacked part of the shaped product of the fiber-reinforced composite material to be obtained) is preferably 3 or larger, more preferably 4 or larger, even more preferably 8 or larger.

In Production Process 4, the average thickness of those portions of materials P and Q where either material P or material Q overlaps the other during the cold press forming is preferably 0.2-5 times, more preferably 0.7-2 times, even more preferably 0.8-1.5 times, the thickness of the stacked part in the shaped product of the fiber-reinforced composite material to be obtained.

INDUSTRIAL APPLICABILITY

The shaped product of the fiber-reinforced composite material of the invention can be used as, for example, structural components for motor vehicles, etc., and reliably renders a weight reduction in car bodies, etc. possible.

What is claimed is:

1. A process for producing, by cold press forming, a shaped product of the fiber-reinforced composite material which comprises: a well-shaped part including a fiber-reinforced composite material C including both discontinuous reinforcing fibers and a thermoplastic resin; and a surface-shaped part including a thermoplastic-resin-based material, wherein the well-shaped part has a deep-drawn shape, and the shaped product includes no irregular-shape portion in the well-shaped part and no weld at a boundary edge between the well-shaped part and the surface-shaped part, the process comprising using forming dies in which a forming cavity is formed with a protrudent die having at least a protrusion and a recessed die having both a recess and a non-recess part, disposing a platy forming material P including the thermoplastic-resin-based material and a platy forming material Q including the fiber-reinforced composite material C between the protrudent die and the recessed die, and closing the forming dies by moving at least one the protrudent die and the recessed die, wherein the tensile elongation at break $\varepsilon V$ (%) of the platy forming material Q, the opening distance L between outlet ends of the recess of the recessed die, and that internal creeping dimension D of the recessed die which corresponds to said opening distance satisfy:

$$D-L\times \varepsilon v/100 > 0,$$

the platy forming material P and the platy forming material Q are disposed between the protrudent die and the recessed die so that at least a part of the platy forming material Q overlaps the platy forming material P and that the platy forming material P and the platy forming material Q lie on a recessed-die side and on a protrudent-die side, respectively, the platy forming material Q is disposed in an amount corresponding to 60 to 400 vol % of the design volume of the well-shaped part of the shaped product of the fiber-reinforced composite material, and the length over which the platy forming material Q overlaps the platy forming material P is 3 to 40 times a thickness of the platy forming material P.

2. The process for production according to claim 1, wherein the protrudent die of the forming dies is an upper die and the recessed die of the forming dies is a lower die, the platy forming material P and the platy forming material Q are disposed over the lower die, the die closing to be conducted by moving at least one of the protrudent die and the recessed die is an operation of at least one of lowering the upper die and raising the lower die, the platy forming material P is disposed on the lower die of the forming dies so that at least a part thereof is in contact with the non-recess part, and the platy forming material Q is disposed so that at least a part thereof overlaps the platy forming material P over the recess of the lower die.

3. The process for production according to claim 2, wherein the platy forming material P has a hole having a size in a range of 5 to 150% of a projected area of the recess of the lower die on which the platy forming material P is to be disposed, the projected area being measured through projection toward the bottom direction.

4. The process for production according to claim 1, wherein the protrudent die of the forming dies is a lower die and the recessed die of the forming dies is an upper die, the platy forming material P and the platy forming material Q are disposed over the lower die, the die closing to be conducted by moving at least one of the protrudent die and the recessed die is an operation of at least one of lowering the upper die and raising the lower die, the platy forming material P is disposed over the protrusion of the lower die by placing the platy forming material P on the platy forming material Q so that at least a part thereof overlaps the platy forming material Q, and the platy forming material Q is disposed on the protrusion of the lower die so that at least a part thereof overlaps the platy forming material P.

5. The process for production according to claim 4, wherein the platy forming material P has a hole having a size in a range of 5 to 150% of a projected area of the recess of the upper die, the projected area being measured through projection toward the bottom direction.

6. The process for production according to claim 1, wherein the platy forming material Q has a tensile elongation at break $\varepsilon V$ of 105 to 400%.

7. The process for production according to claim 1, wherein the platy forming material P has a hole, an incision, or both, and the platy forming material P is disposed in the forming dies so that after the forming dies have been closed, the hole or the incision or both of the platy forming material P are in contact with the recess of the recessed die.

\* \* \* \* \*